US012751872B2

(12) United States Patent
Livingston

(10) Patent No.: US 12,751,872 B2
(45) Date of Patent: Oct. 6, 2026

(54) POWERED TRACK ATTACHMENT FOR WHEELCHAIR

(71) Applicant: Tour Engineering LLC, Golden, CO (US)

(72) Inventor: Daniel Livingston, Golden, CO (US)

(73) Assignee: Tour Engineering LLC, Golden, CO (US)

( * ) Notice: Subject to any disclaimer, the term of this patent is extended or adjusted under 35 U.S.C. 154(b) by 504 days.

(21) Appl. No.: 18/357,747

(22) Filed: Jul. 24, 2023

(65) Prior Publication Data

US 2024/0041675 A1 Feb. 8, 2024

Related U.S. Application Data

(60) Provisional application No. 63/370,140, filed on Aug. 2, 2022.

(51) Int. Cl.
*A61G 5/10* (2006.01)
*A61G 5/06* (2006.01)

(52) U.S. Cl.
CPC .................................... *A61G 5/066* (2013.01)

(58) Field of Classification Search
CPC ...... A61G 5/066; A61G 5/061; A61G 3/0808; B62D 55/02
USPC ......................................... 280/5.22; 180/9.32
See application file for complete search history.

(56) References Cited

U.S. PATENT DOCUMENTS 4,257,644 A * 3/1981 Stephens .............. A61G 3/0808 410/12
4,960,180 A * 10/1990 Livingston ............. B62D 55/06 180/907
D320,579 S * 10/1991 Manning .......................... D12/1
8,459,660 B2 * 6/2013 Livingston ............. A61G 5/061 188/68
2015/0096818 A1 * 4/2015 Ewing .................. A61G 3/0808 180/9.1

(Continued)

FOREIGN PATENT DOCUMENTS

CN 110169880 A * 8/2019 ........... A61G 5/1048

OTHER PUBLICATIONS

Eco Rover Chairs, published Mar. 8, 2022, retrieved from web machine on Nov. 18, 2025.URL https://web.archive.org/web/20220308203034/https://ecoroverchairs.com/. (Year: 2022).*

*Primary Examiner* — Alentin Neacsu
*Assistant Examiner* — Nabin Kumar Sharma
(74) *Attorney, Agent, or Firm* — Trenner Law Firm, LLC; Mark Trenner

(57) ABSTRACT

A powered track attachment for a wheelchair is disclosed. In an example, the powered track attachment includes a frame supporting an electric motor. A wheel platform is attached to the frame and supports wheels on the wheelchair. At least one track system is provided having a plurality of individual track members. A majority of the plurality of individual track members have protrusions formed thereon. The plurality of individual track members linked together forming a continuous track. At least one drive cog of the at least one track system has a plurality of depressions formed therein. The plurality of depressions mate with the protrusions formed on the individual track members of the at least one track system. The at least one drive cog rotates under power of the electric motor to move the continuous track and thereby move the wheelchair across terrain.

20 Claims, 22 Drawing Sheets

(56) References Cited

U.S. PATENT DOCUMENTS

2019/0291793 A1* 9/2019 Johnson ................. B62D 55/02

* cited by examiner

POWERED TRACK ATTACHMENT FOR WHEELCHAIR

PRIORITY CLAIM

This application claims the priority filing benefit of U.S. Provisional Patent Application No. 63/370,140 filed Aug. 2, 2022 for "Powered Track Attachment For Manual Wheelchair" of Daniel Livingston, hereby incorporated by reference in its entirety as though fully set forth herein.

BACKGROUND

Wheelchairs are designed with large push wheels and small front casters for turning, to traverse hard surfaces as efficiently as possible. But the inherent design of wheelchairs also limits access to off-pavement terrain. Gravel, grass, snow, mud, sand and other soft surfaces are nearly impossible to traverse with a standard wheelchair due to the high pressure point load of the push wheels and front casters.

There are specialty "off-road" wheelchairs with four wheel drive that are large and heavy, fully contained power wheelchairs that require the user to transfer from their own wheelchair to the power wheelchair. A majority of wheelchair users have chair seating that is customized to their body to help reduce the occurrence of sores and pressure points. As such, most users often prefer to remain in their own wheelchair. In addition, these specialty off-road devices can be 300-500 lbs and require specialized transport to the location of use, such as by trailer or flatbed truck.

Other options for beach and sand use are balloon style wheels designed to lower ground pressure and traverse over the unpaved ground. These devices, however, cannot be pushed by the user alone, and typically require the help of someone else to push the wheelchair. In addition, these wheelchairs are large and can be difficult to transport.

Ground pads can also be used at the beach, allowing users to roll their wheelchair over sand or other unpaved surfaces. But ground pads can be bulky to transport and store, difficult to use, and typically require another person to help lay out and gather up again.

DETAILED DESCRIPTION

Figure 1:
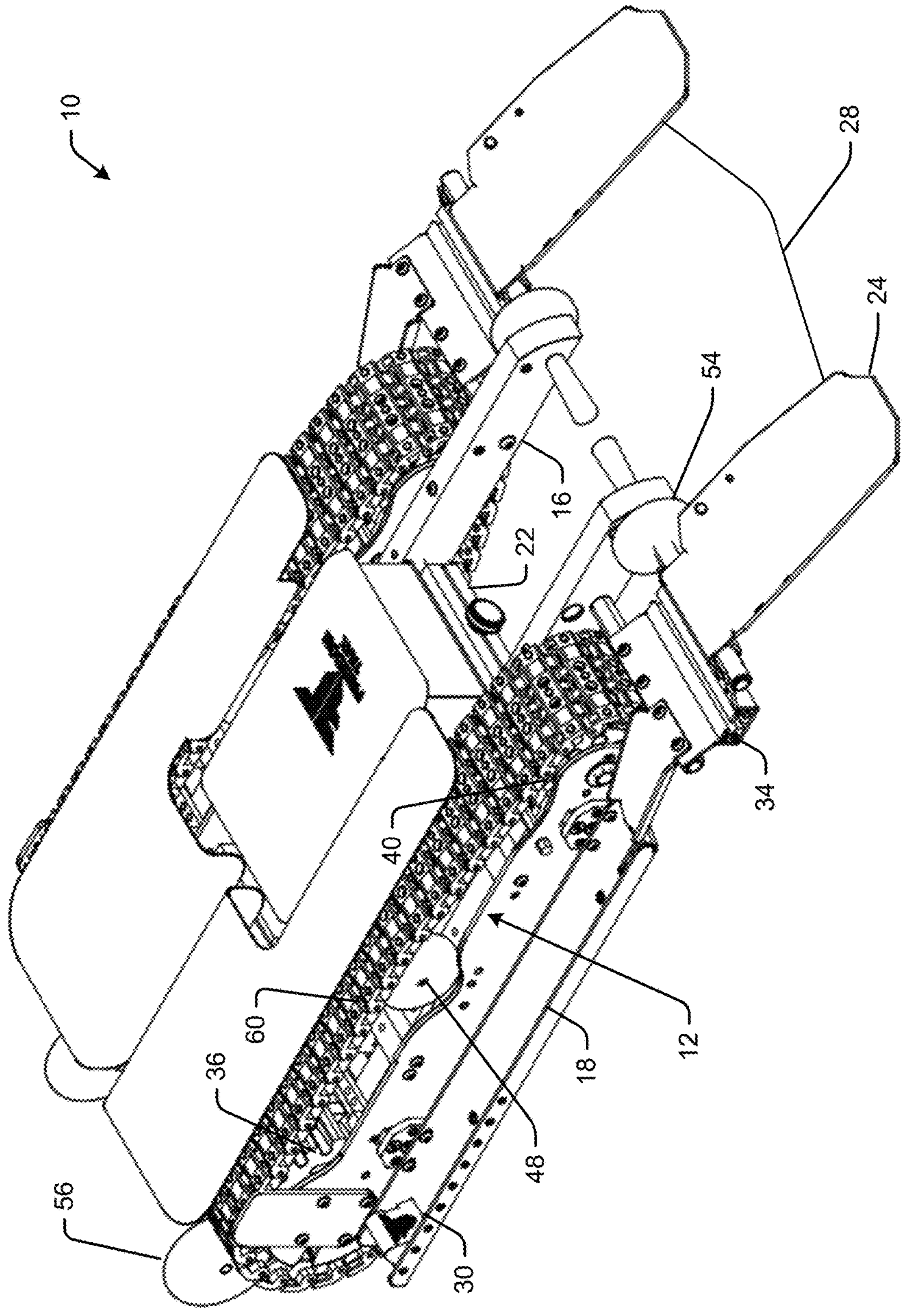
FIG. 1 is a top perspective view of an example powered track attachment for a wheelchair.

A powered track attachment for a wheelchair is disclosed as it may be provided for a variety of wheelchairs. An example of the powered track attachment provides wheelchair users the ability to more readily traverse off-pavement terrain while remaining in their own wheelchair. The example powered track attachment may be operated by the wheelchair user without assistance from others. The example powered track attachment may also be readily transported along with the wheelchair to various locations.

An example of a powered track attachment for a wheelchair includes an electric (e.g., battery powered) motor. The wheelchair may be loaded onto the powered track attachment and operated by the wheelchair user to drive one or more lightweight continuous tracks that can readily traverse a variety of different terrains that might not otherwise be traversable in a wheelchair.

In an example, the powered track attachment has two track systems, a right track system and a left track system. However, the powered track attachment may include a single track system or more than two track systems. Each track system includes a plurality of individual track members (or cleats) that are linked to one another (e.g., by individual rods). The linked track members may be provided between a drive cog and a stabilizing (or front) cog. In another example, the drive cog may be provided elsewhere along the length (e.g., in the front or mid sections) of the continuous track. In such an example, both a front and rear stabilizing cog may be provided.

Each of the track members (or cleats) is configured with a number of protrusions. These protrusions mate with corresponding depressions of the drive cog and stabilizing cog when the track members come into contact with the drive cog and stabilizing cog. In another example, the track members may be provided with depressions and/or protrusions and the cog(s) may have corresponding mating depressions and/or protrusions. In any configuration, the drive cog may be operated to move the track members in a continuous path along the length of the track (belt or loop) formed by the track members.

In an example, each track system is powered by independent electric motors that power the drive cog(s) and move the tracks independently relative to one another. In an example, a “joystick” controller is connected via wire to a controller module located within the device. The controller may be mounted via clamp to the wheelchair frame and allows the user to operate and maneuver the powered track attachment similar to a power wheelchair. Other operating and/or control systems may also be provided, including but not limited to manual mechanisms such as levers or wheels, or automated systems such as so-called “smart driving” computer systems with video input that may be operated automatically and/or with minimal user input.

At least one bogie wheel may be provided between the drive cog and the stabilizing (or front) cog. In an example, the bogie wheel(s) are provided as a bogie suspension system. The bogie wheel(s) provides wheels on the ground. The bogie suspension system serves as suspension support, providing a smoother ride for the user. A spring-loaded tensioner may also be located approximately mid-track. In an example, the spring-loaded tensioner is provided with the bogie suspension system. The spring-loaded tensioner removes slack in the track system, and maintains the track system under tension during operation regardless of the terrain that is being traversed.

Before continuing, it is noted that as used herein, the terms “includes” and “including” mean, but is not limited to, “includes” or “including” and “includes at least” or “including at least.” The term “based on” means “based on” and “based at least in part on.”

The operations shown and described herein are provided to illustrate example implementations. It is noted that the operations are not limited to the ordering shown. Still other operations may also be implemented.

Figure 2:
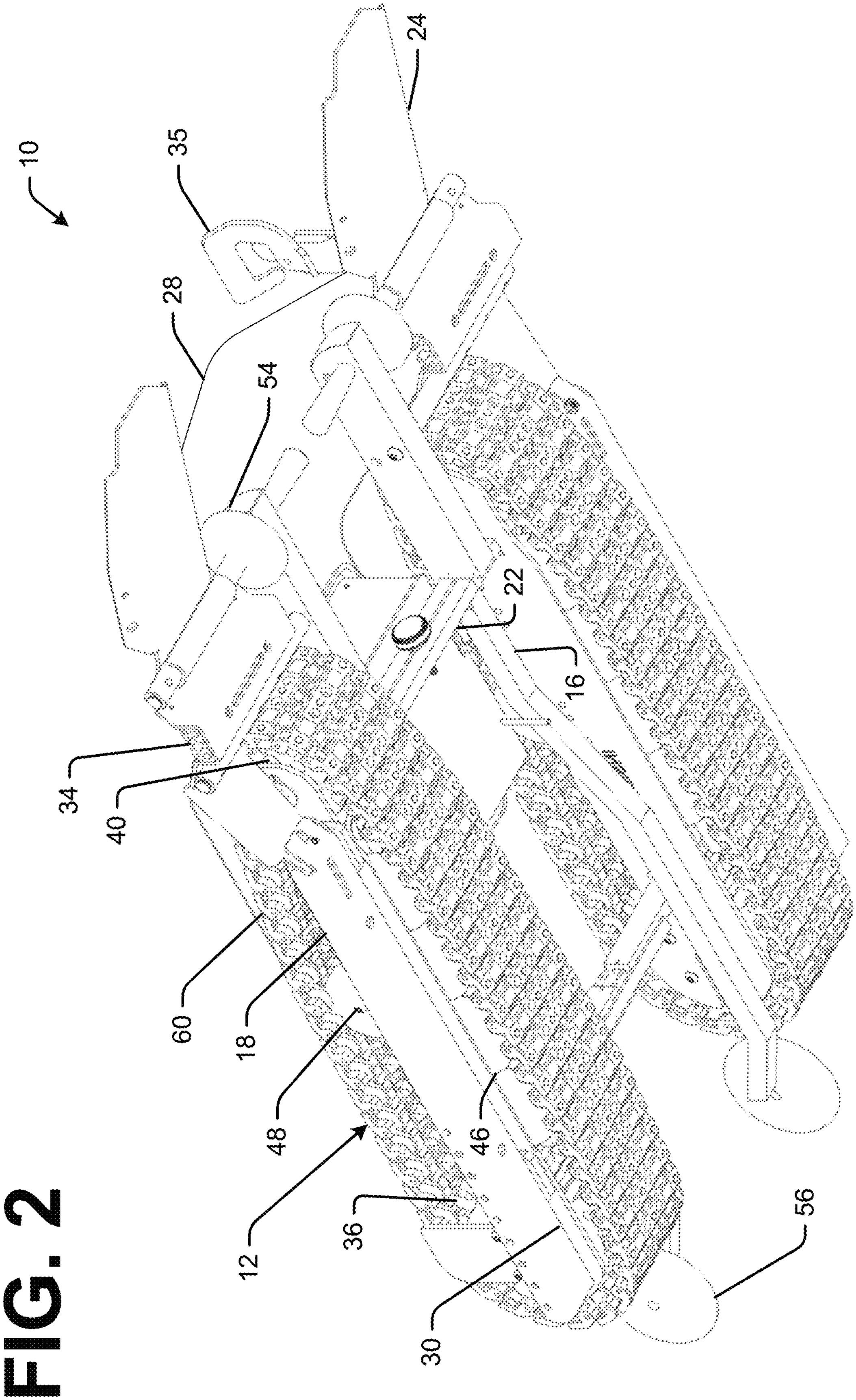
FIG. 2 is a bottom perspective view of the example powered track attachment for a wheelchair.
Figure 3:
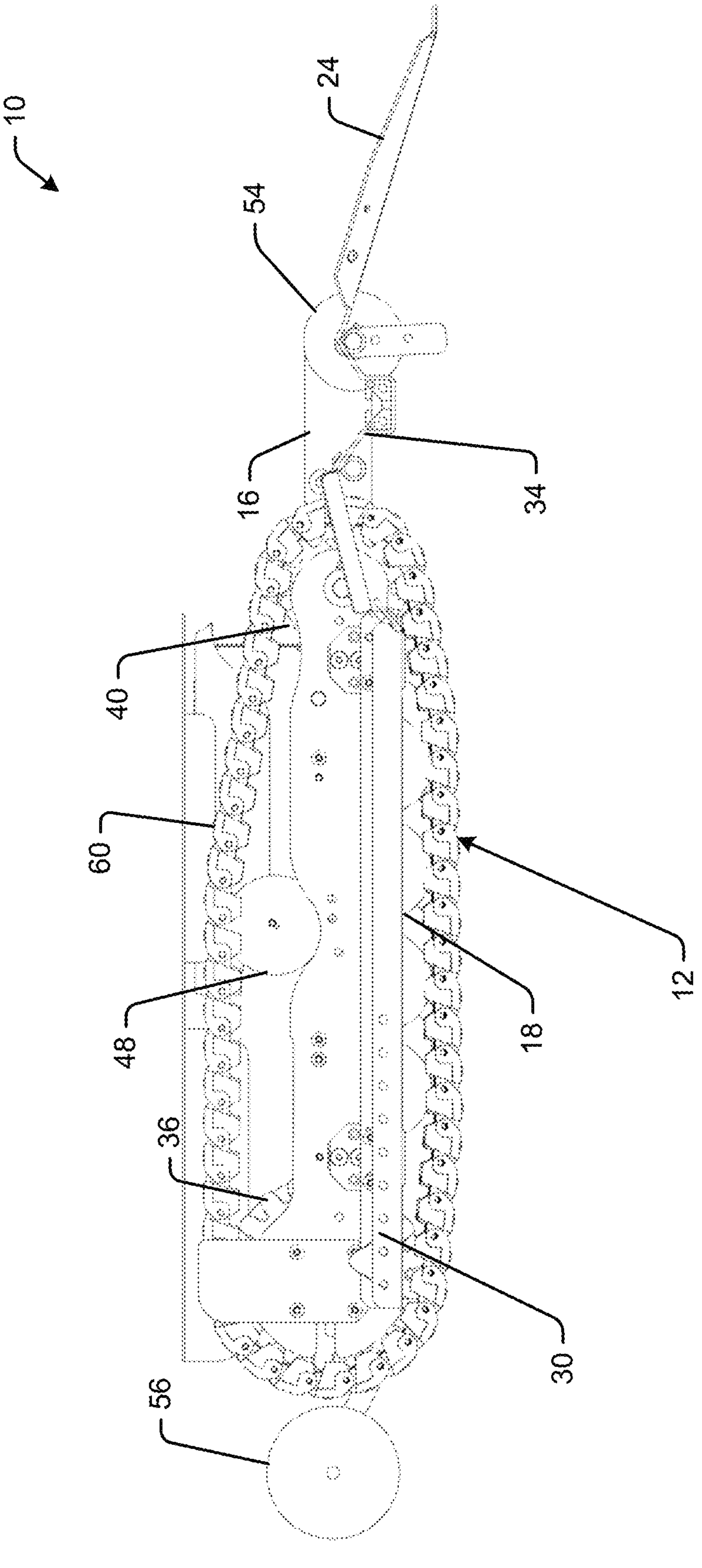
FIG. 3 is a side view of the example powered track attachment shown in FIGS. 1 and 2.
Figure 21:
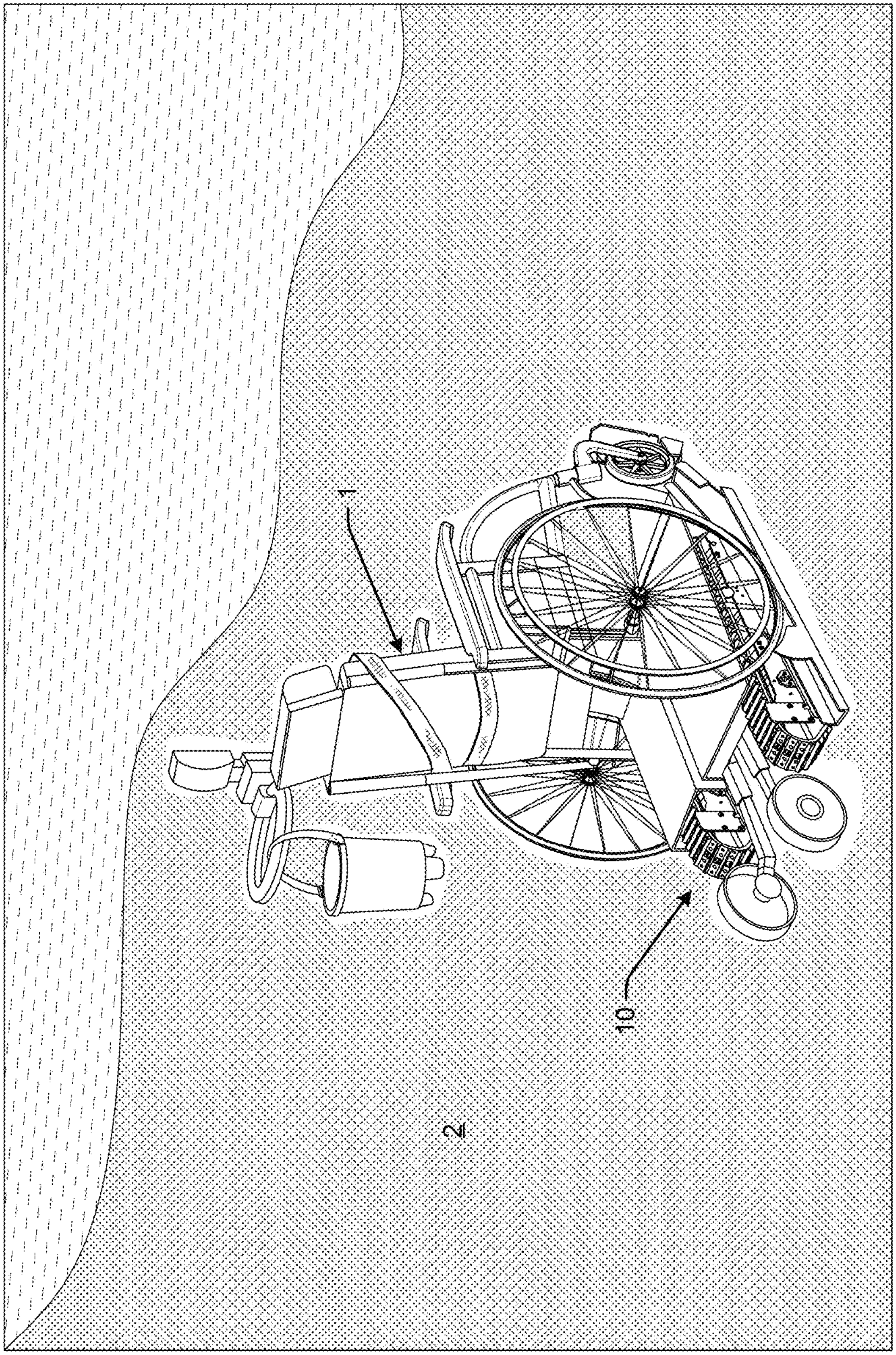
FIGS. 21 and 22 show the example powered track attachments for a wheelchair in use on an illustrative beach environment.
Figure 22:
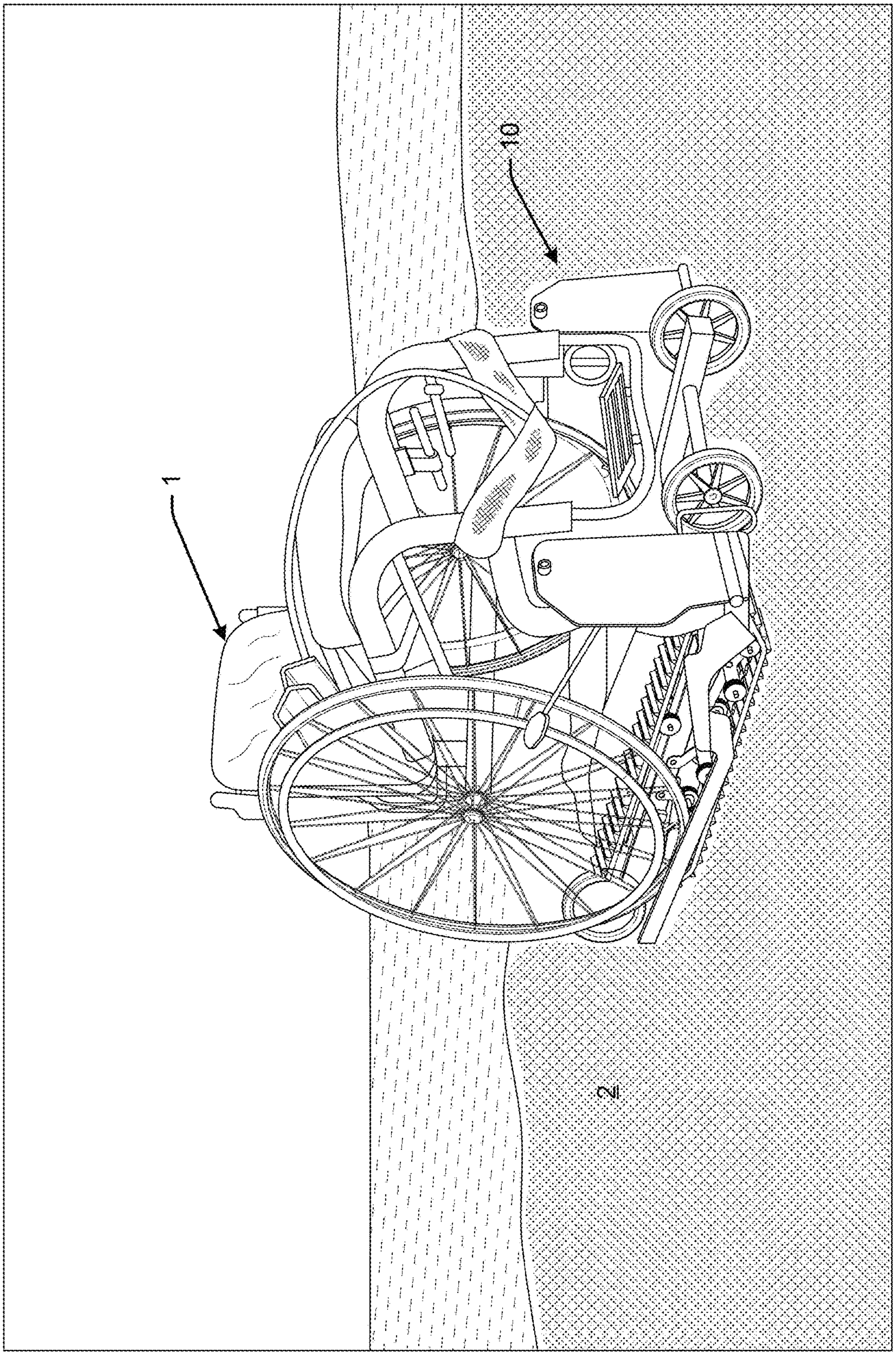

FIG. 1 is a top perspective view of an example powered track attachment 10 for a wheelchair (see, e.g., wheelchair 1 in FIGS. 21 and 22). The powered track attachment 10 may be used with most manual and electric wheelchairs. FIG. 2 is a bottom perspective view of the example powered track attachment 10 for a wheelchair. FIG. 3 is a side view of the example powered track attachment 10 shown in FIGS. 1 and 2. The powered track attachment 10 may be lightweight, and battery powered, for efficient operation. The powered track attachment 10 may be operated to move the wheelchair over various terrains that the wheelchair might not otherwise be able to traverse (e.g., wheelchair 1 traversing beach sand in FIGS. 21 and 22).

In an example, the powered track attachment 10 includes separate right and left continuous track systems 12 mounted to a frame 16, e.g., by supporting components. The wheelchair may be wheeled onto separate wheel platforms 18 attached to each side of the frame 16 of the powered track attachment 10. In an example, the wheel platforms 18 are adjustable in width (e.g., by a central coupler 22 joining both track systems 12). The overall width can be adjusted so that the wheel platforms 18 fit most wheelchairs on the market.

In an example, the powered track attachment 10 includes a hinged or retractable front ramp (or ramps) 24. The ramps 24 can be lowered (manually or via an electric motor) to the ground so that the wheelchair can be wheeled onto the powered track attachment 10. In an example, the wheelchair is rolled backward up the ramps 24 and onto the powered track attachment 10. In other examples, the ramps 24 may be provided on the front and/or rear of the powered track attachment 10 and the wheelchair can be rolled forward and/or backward up the ramps 24.

The ramps 24 provide a low entry angle for the wheelchair so that the user can wheel the wheelchair under their own power (or with assistance) onto the powered track attachment 10. After boarding the wheelchair, the ramp(s) 24 may be raised. In an example, a bungee 28 with an adjustable length hook is attached to the ramps 24, allowing the user to raise and secure the ramp(s) 24. For example, the bungee 28 may be connected to the ramp(s) 24 and hooked onto the wheelchair and/or powered track attachment 10 by the user to retain the ramp(s) 24 in the raised position.

In an example, the rear push wheels of the wheelchair rest in a cradle 30 formed by the wheel platforms 18, respectively. The cradle 30 is designed to accommodate most wheelchair wheels on the market. The front casters of the wheelchair rest in a forward portion (or separate) cradle 34. The cradle 34 may include an integrated t-slot extrusion capture mechanism 35 that operates to adjust to the width of the front casters of the wheelchair, to help retain a solid hold on the wheelchair when mounted to the powered track attachment 10. In an example, a capture system includes a rope cinch lock securing the front caster axle to the front caster cradle.

It is noted that the examples described herein are provided for purposes of illustration, and are not intended to be limiting. Other devices and/or device configurations may be utilized to carry out the operations described herein, as will be readily understood by those having ordinary skill in the art after becoming familiar with the teachings herein. The scope of the claims is not intended to be limited to the example device configurations shown and described herein.

Figure 4:
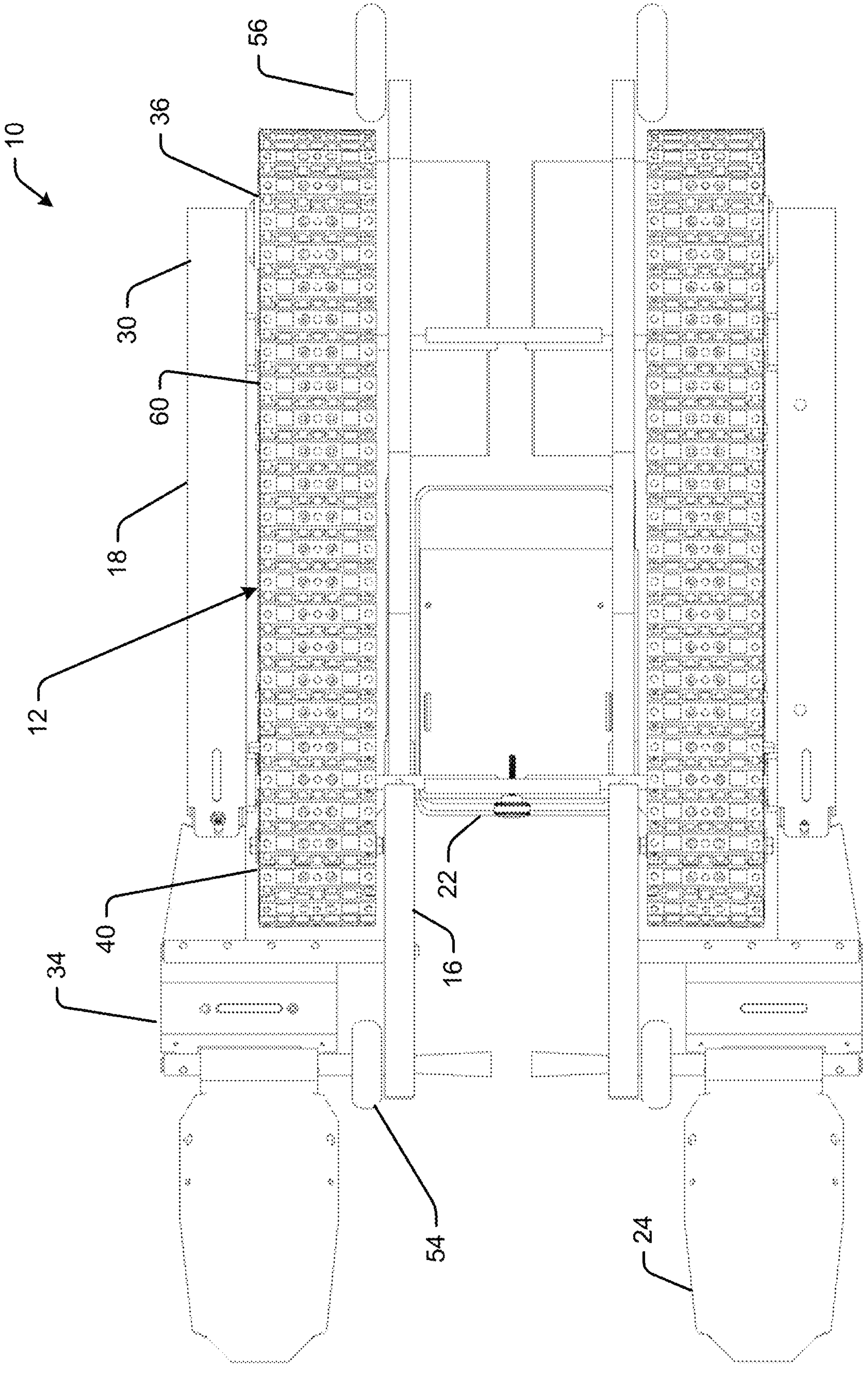
FIG. 4 is a bottom view of the example powered track attachment shown in FIGS. 1 and 2.
Figure 5:
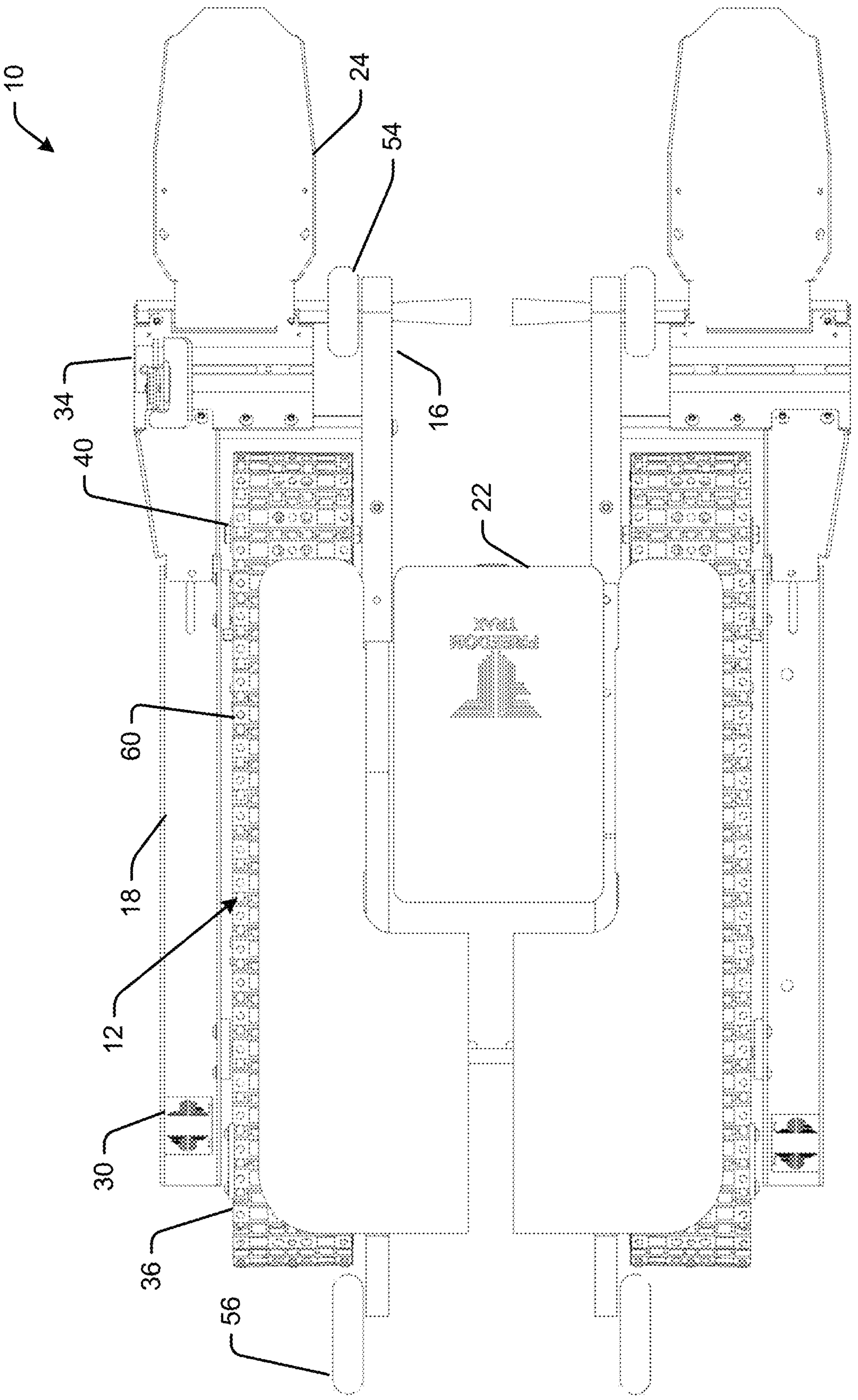
FIG. 5 is a top view of the example powered track attachment shown in FIGS. 1 and 2.
Figure 6:
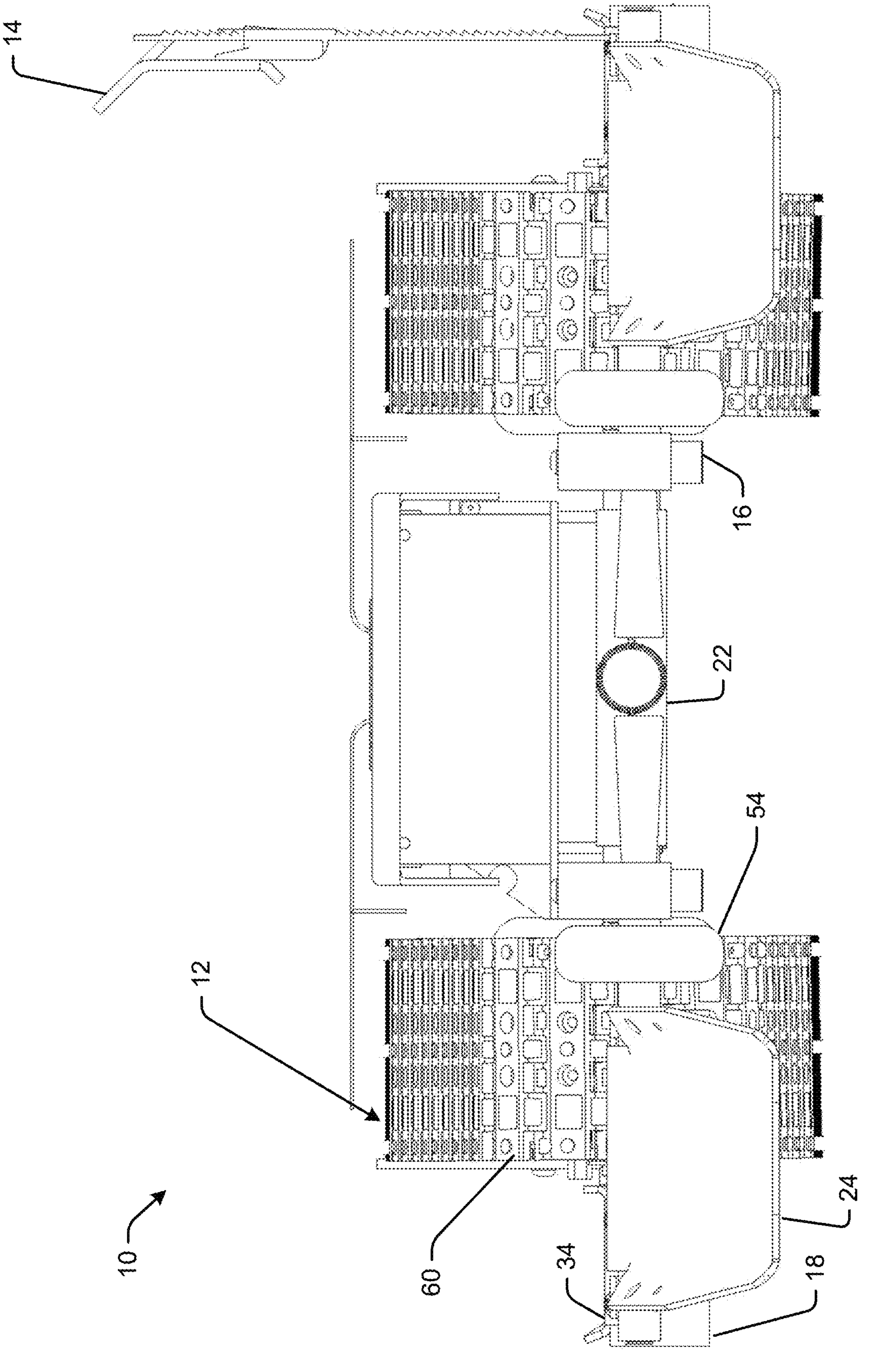
FIG. 6 is a front side view of the example powered track attachment shown in FIGS. 1 and 2.
Figure 7:
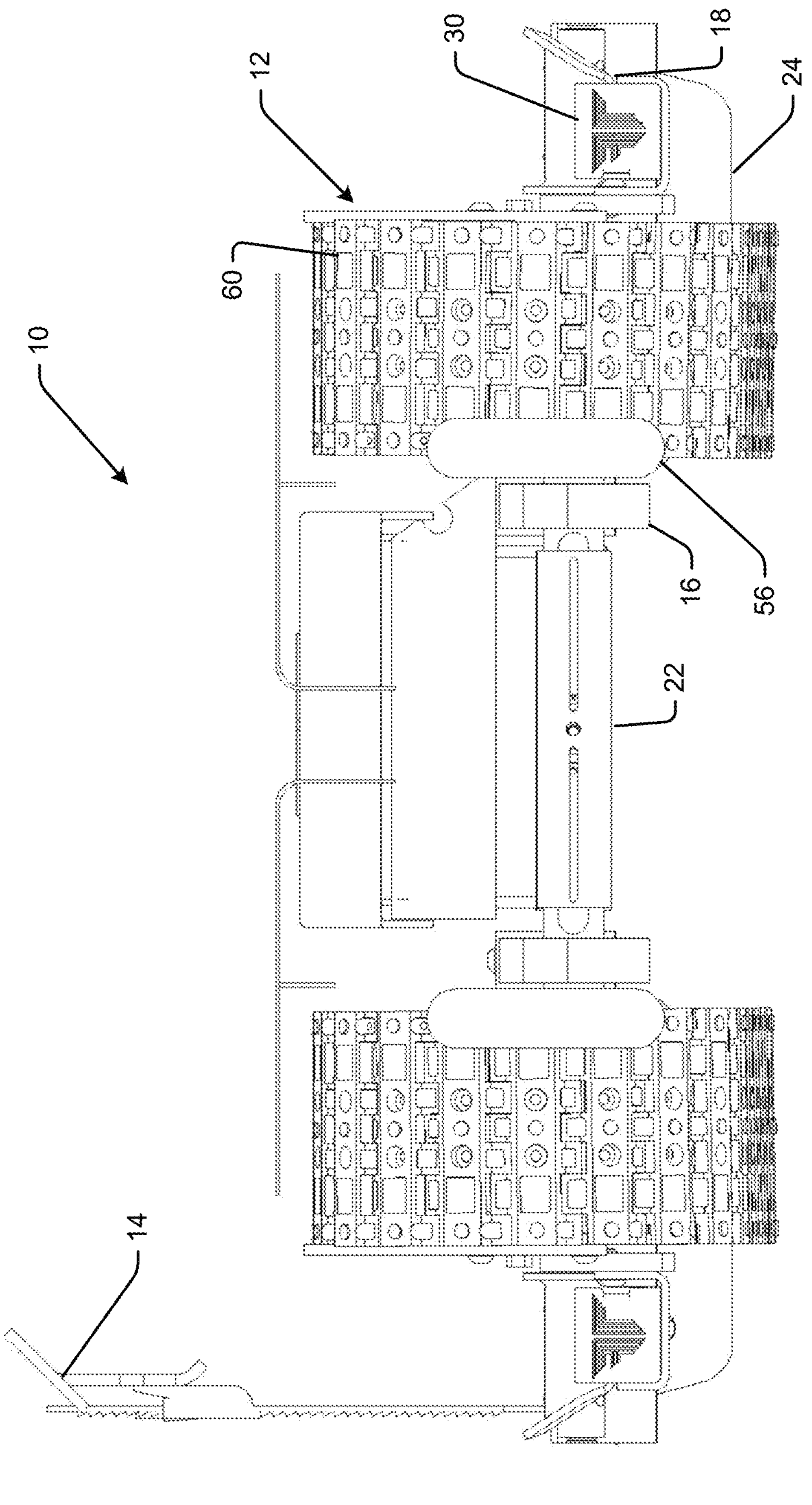
FIG. 7 is a back side view of the example powered track attachment shown in FIGS. 1 and 2.

FIG. 4 is a bottom view of the example powered track attachment 10 shown in FIGS. 1 and 2. FIG. 5 is a top view of the example powered track attachment 10 shown in FIGS. 1 and 2. FIG. 6 is a front side view of the example powered track attachment 10 shown in FIGS. 1 and 2. FIG. 7 is a back side view of the example powered track attachment 10 shown in FIGS. 1 and 2.

The powered track attachment 10 includes one or more continuous track systems 12. It is noted that the track system(s) 12 disclosed herein are different than ordinary rubber tracks that are commercially available. Continuous rubber tracks require a large amount of power to operate, and hence are typically provided on small forklifts and skid steer tractors. These rubber tracks are not feasible for use on a wheelchair. Instead, the powered track attachment 10 disclosed herein utilizes a highly efficient continuous track with cleats. The cleats enable the track to rotate more freely around the cogs and keep the track stable. A rubber track requires a much greater degree of tension to remain stable. The cleats also offer a greater slip coefficient than a continuous rubber track. This enables both tracks of the powered track attachment 10 to turn independently of one another, with less power having to be applied, making the powered track attachment 10 well suited for use with wheelchairs.

The track systems 12 may each have a drive cog 36 (e.g., rear mounted), a stabilizing (or front) cog 40, and a bogie suspension system 44 (see, e.g., FIG. 17) having one or more bogie wheels 46. In an example, a spring-loaded tensioner 48 is located approximately midway between the drive cog 36 and the stabilizing cog 40. In an example, the tensioner 48 includes one or more wheels (e.g., wheel pair 50 in FIG. 17) mounted on the bogie suspension system 44. The tensioner 48 removes slack in the track, and maintains the track in tension.

The bogie wheels 46 may be mounted on a separate frame 52 to provide suspension thereby increasing user comfort during use. The powered track attachment 10 may also include one or more ground wheels, such as front ground wheels 54 and/or rear ground wheels 56. Any number and location of ground wheels may be provided. The ground wheels may also be mounted via suspension to improve user comfort during use.

In an example, each track system 12 is powered by a separate electric motor mounted to the frame 16 to rotate the drive cog 36. The motor may be located near the rear of the frame if the drive cog 36 is located in the back of the track system 12. Likewise, the motor and drive cog 36 may be located in other suitable positions in the track system 12. In an example, each drive motor is connected to the drive cog 36 via a drive shaft or other linkage, respectively. In another example, the drive motor is a hub motor, and the external side profile of the drive cog 36 (e.g., as seen in FIG. 8) is mated to a corresponding mating profile of the outside of the hub motor and/or shaft of the hub motor.

Independent motors for each track system 12 enable the (left and right) tracks to move independently of one another, thus enabling turning the device 10 (similar to a skid steer). In an example, the motors are operated by the user via a controller 14 (e.g., a so-called "joystick"). The controller 14 may be connected via wire (or wirelessly) to a control module located on the device 10. The controller 14 may be mounted to the frame 16 and/or removably mounted to the wheelchair, e.g., via a clamp or clip. The controller 14 allows the user to operate and maneuver the powered track attachment 10.

Figure 8:
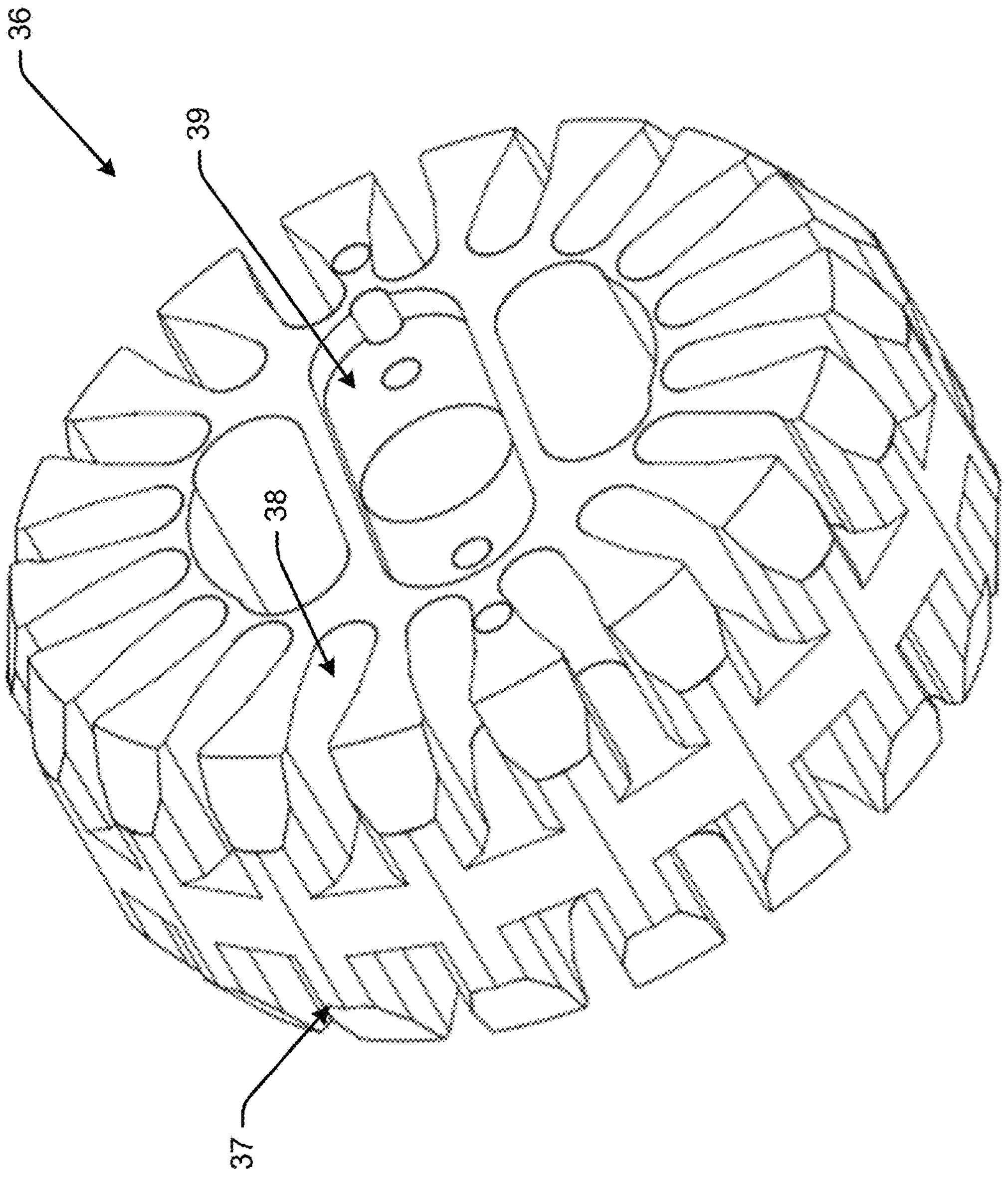
FIG. 8 is a perspective view of an example drive cog of the example powered track attachment for a wheelchair.

FIG. 8 is a perspective view of an example drive (e.g., rear) cog 36 of the example powered track attachment 10 for a wheelchair. The drive cog 36 includes an engagement pattern 37. For example, the engagement pattern 37 shown in FIG. 8 includes a repeating H-shape around the outer circumference of the drive cog 36. The H-shape forms depressions 38 in the top and side surfaces of the drive cog 36, which engage with the protrusions or cleats 61 formed on the track members 60 (see, e.g., FIG. 13). Also seen in FIG. 8 is a shaft opening 39 with an oblong shaped engagement channel for connecting the drive shaft to the drive cog 36. Connecting a mating oblong shaped mounting portion of the drive shaft to the oblong shaped engagement channel enables the drive shaft to rotate the drive cog 36 without the drive shaft slipping in the drive cog 36.

Figure 9:
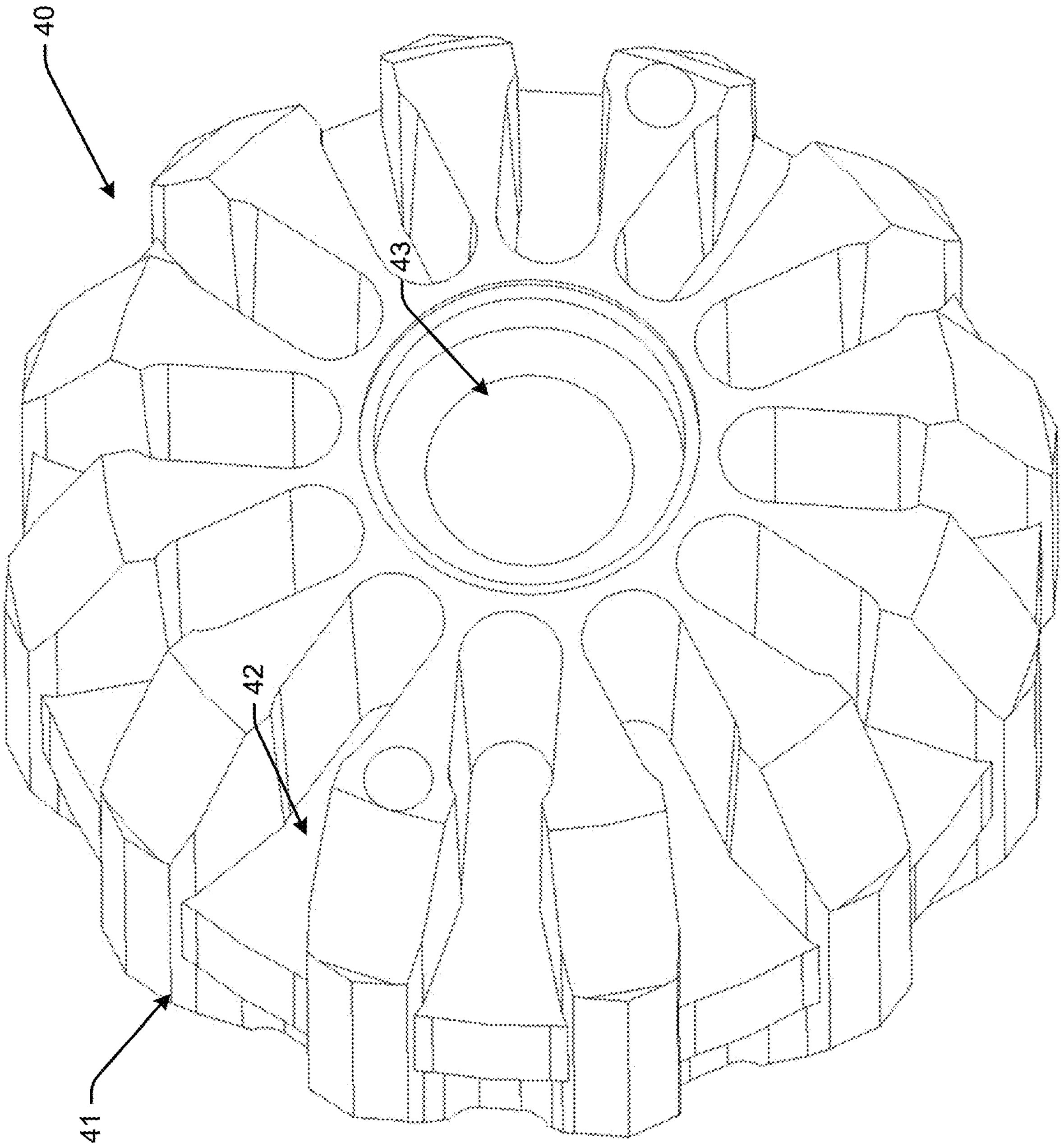
FIG. 9 is a perspective view of an example stabilizing (e.g., front) cog of the example powered track attachment for a wheelchair.
Figure 10:
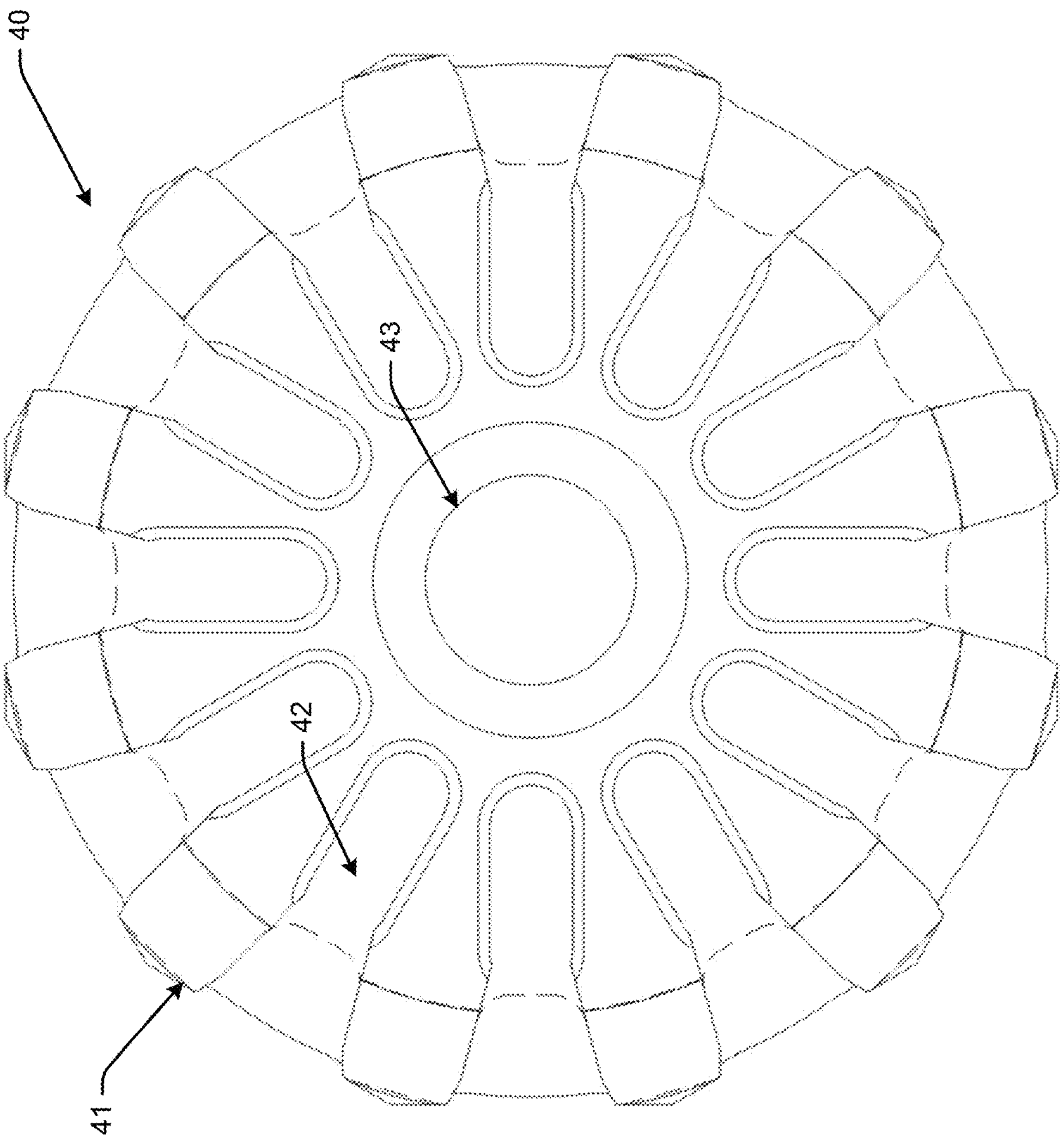
FIG. 10 is a side view of the example stabilizing (e.g., front) cog corresponding to FIG. 9.

FIG. 9 is a perspective view of an example stabilizing (e.g., front) cog of the example powered track attachment for a wheelchair. FIG. 10 is a side view of the example stabilizing (e.g., front) cog 40 corresponding to FIG. 9. The stabilizing cog 40 also includes an engagement pattern 41. For example, the engagement pattern 41 shown in FIG. 9 includes a repeating H-shape around the outer circumference of the stabilizing cog 40. The H-shape forms depressions 42 in the top and side surfaces of the stabilizing cog 40, which engage with the protrusions or cleats 61 formed on the track members 60 (see, e.g., FIG. 13). Also seen in FIG. 9 is a shaft opening 43.

Figure 11:
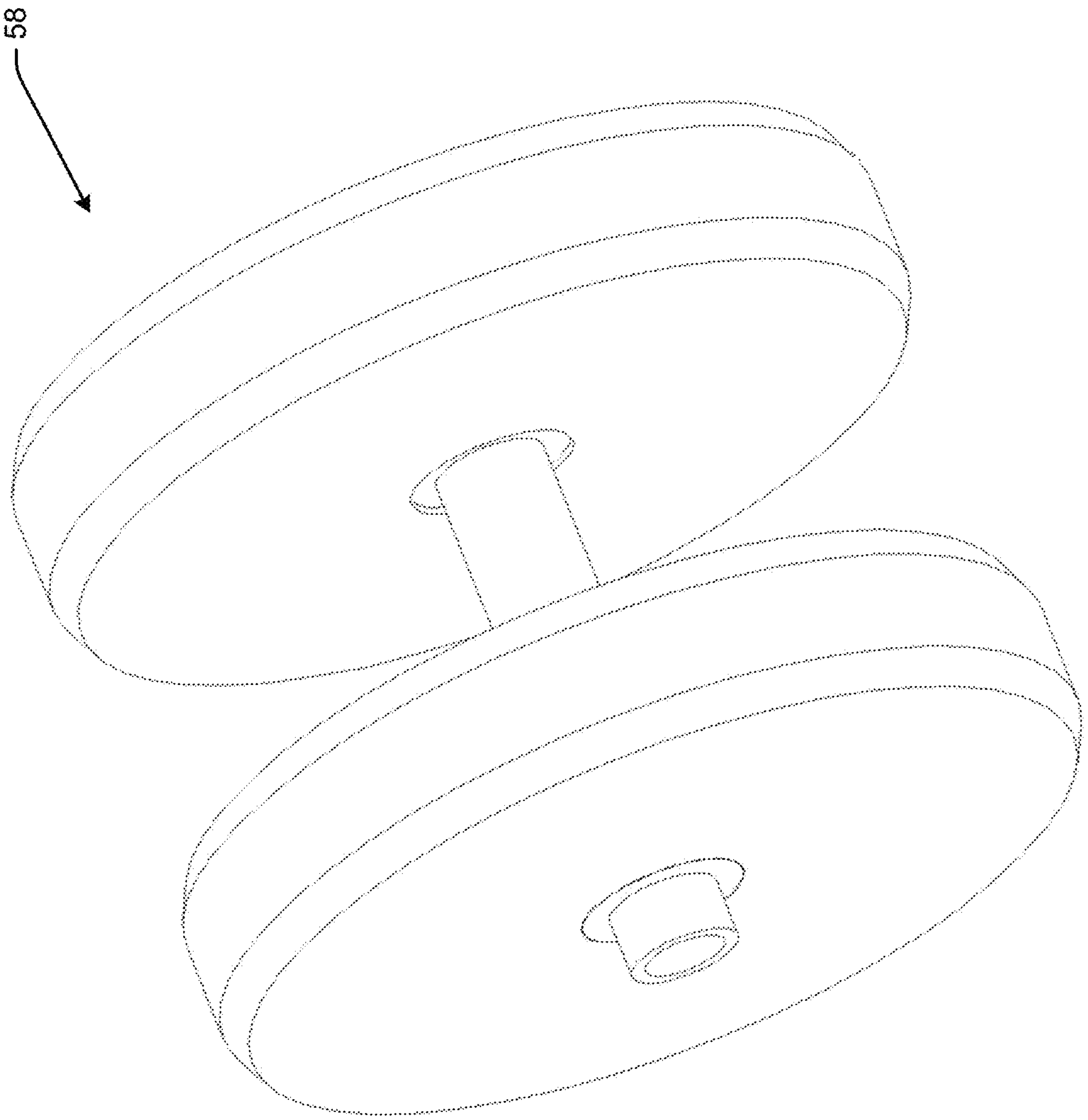
FIG. 11 is a perspective view of another example stabilizing cog of the example powered track attachment for a wheelchair.
Figure 12:
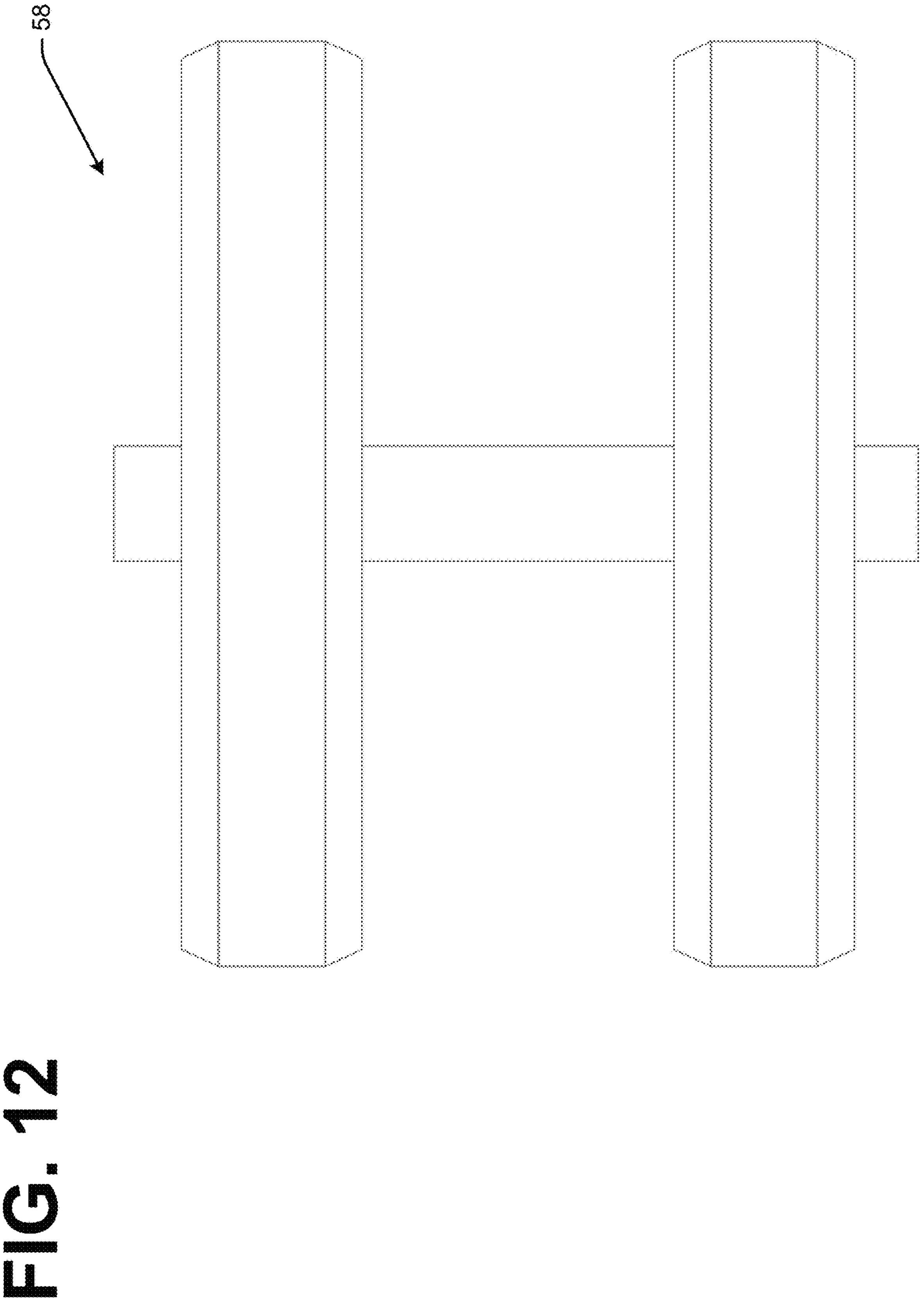
FIG. 12 is a front view of the example stabilizing cog corresponding to FIG. 11.

It is noted that the example cogs 36 and 40 are provided for purposes of illustration, and are not intended to be limiting. By way of example, FIG. 11 is a perspective view of another example stabilizing cog 58 of the example powered track attachment for a wheelchair. FIG. 12 is a front view of the example stabilizing cog 58 corresponding to FIG. 11. The cog wheel 58 engages with the track members 60 similar to the bogie wheels. The design of the cog wheel(s) 58 provide a smoother, quieter ride for the user, and tends to reduce stretching the track because the cog wheel(s) 58 do not mesh with the track.

Still other configurations of the drive cog(s) 36 and/or the stabilizing cog(s) may be utilized to carry out the operations described herein, as will be readily understood by those having ordinary skill in the art after becoming familiar with the teachings herein. The scope of the claims is not intended to be limited to the example cog configurations shown and described herein.

Each track system 12 is comprised of a plurality of individual track members 60 having protrusions or cleats 61. The individual track members 60 are linked to one another to form a belt or track (see, e.g., FIGS. 1 and 2). For example, the track members 60 may be linked by individual rods provided through openings 62*a* in a first cleat and through openings 62*b* in the adjacent cleat. The linked track members 60 form a belt that may span between the drive cog 36 and the stabilizing (or front) cog 40 of each track system 12.

As discussed above with reference to the cogs 36, 40, the protrusions 61 mate with the corresponding depressions 38, 42 formed in the drive cog 36 and stabilizing cog 40, respectively, when the track members 60 come into contact with the drive cog 36 and stabilizing cog 40. Thus, rotating the drive cog 36 moves the track member 60 in a forward or reverse direction along a continuous path between the drive cog 36 and the stabilizing cog 40.

Figure 13:
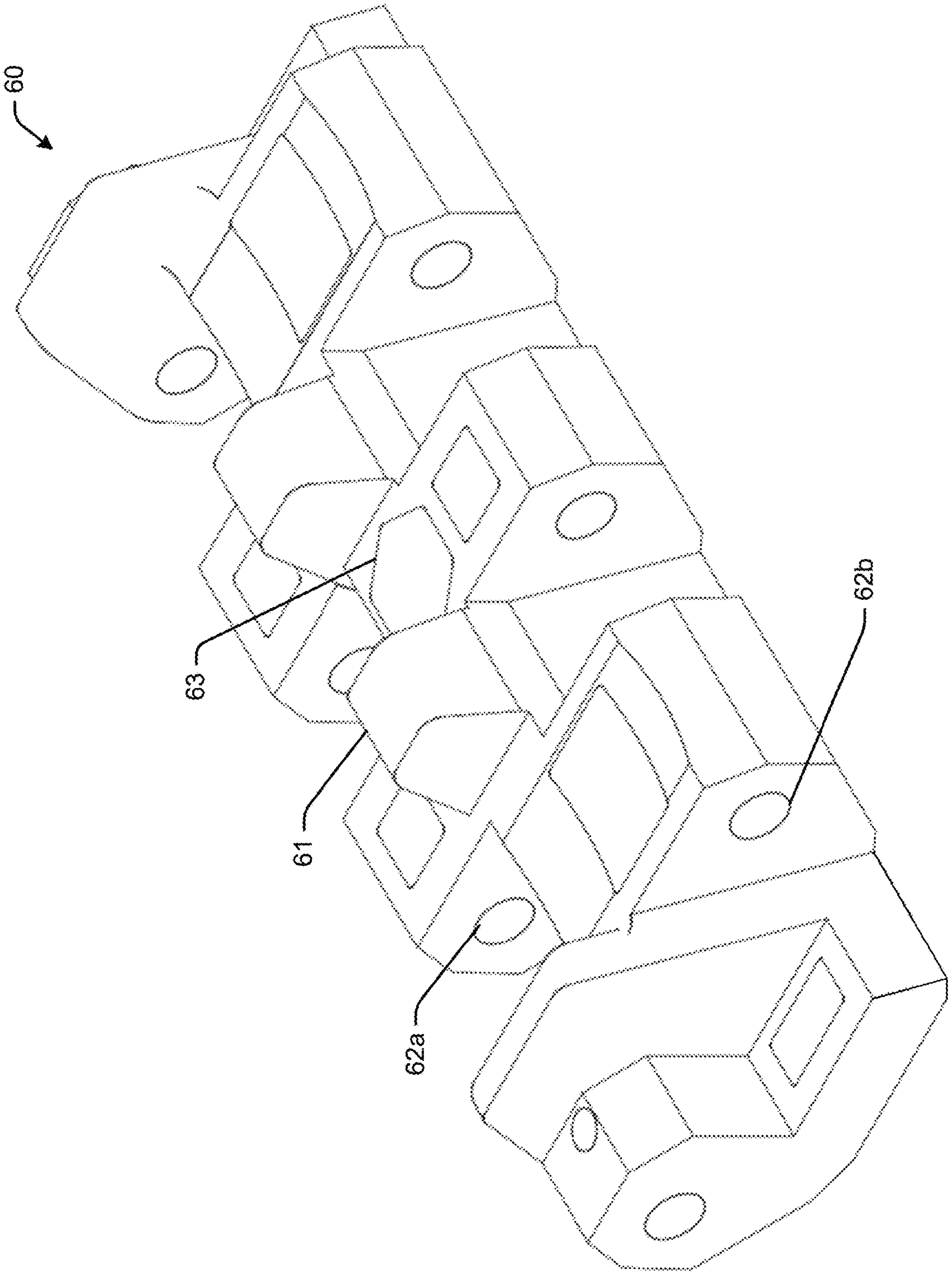
FIG. 13 is a perspective view of an example track member of the example powered track attachment for a wheelchair.

FIG. 13 is a perspective view of an example track member 60 of the example powered track attachment 10 for a wheelchair. As noted above, each track member 60 has protrusions (e.g., two protrusions 61 are shown in FIG. 13) substantially matching with the specialized patterns 37, 41 formed on the outer surface(s) of the drive cog 36 and stabilizing cog 40, respectively, and provide a mating engagement between the track member 60 and the drive cog 36 and stabilizing cog 40.

Figure 14:
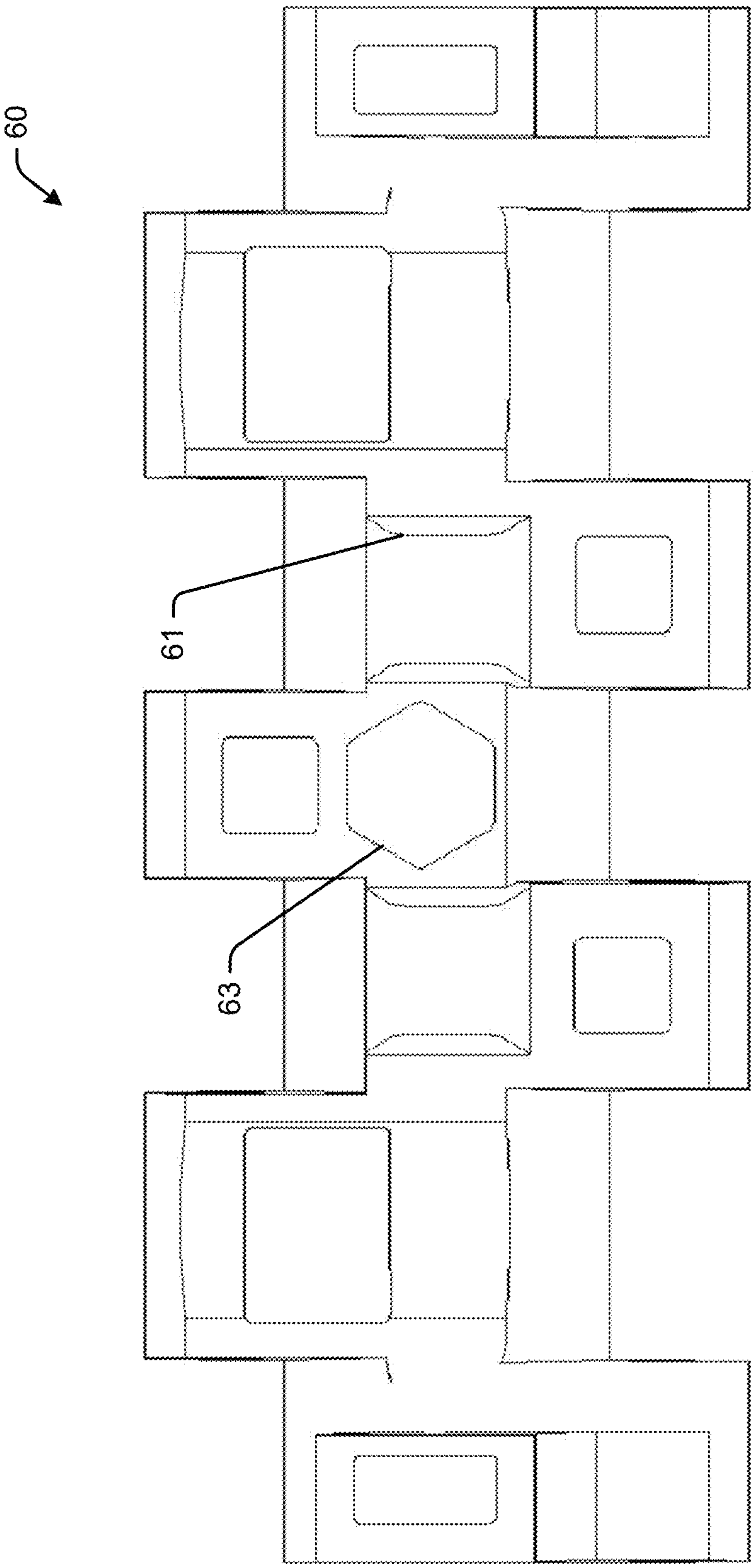
FIG. 14 is a top view of an example track member shown in FIG. 13.
Figure 15:
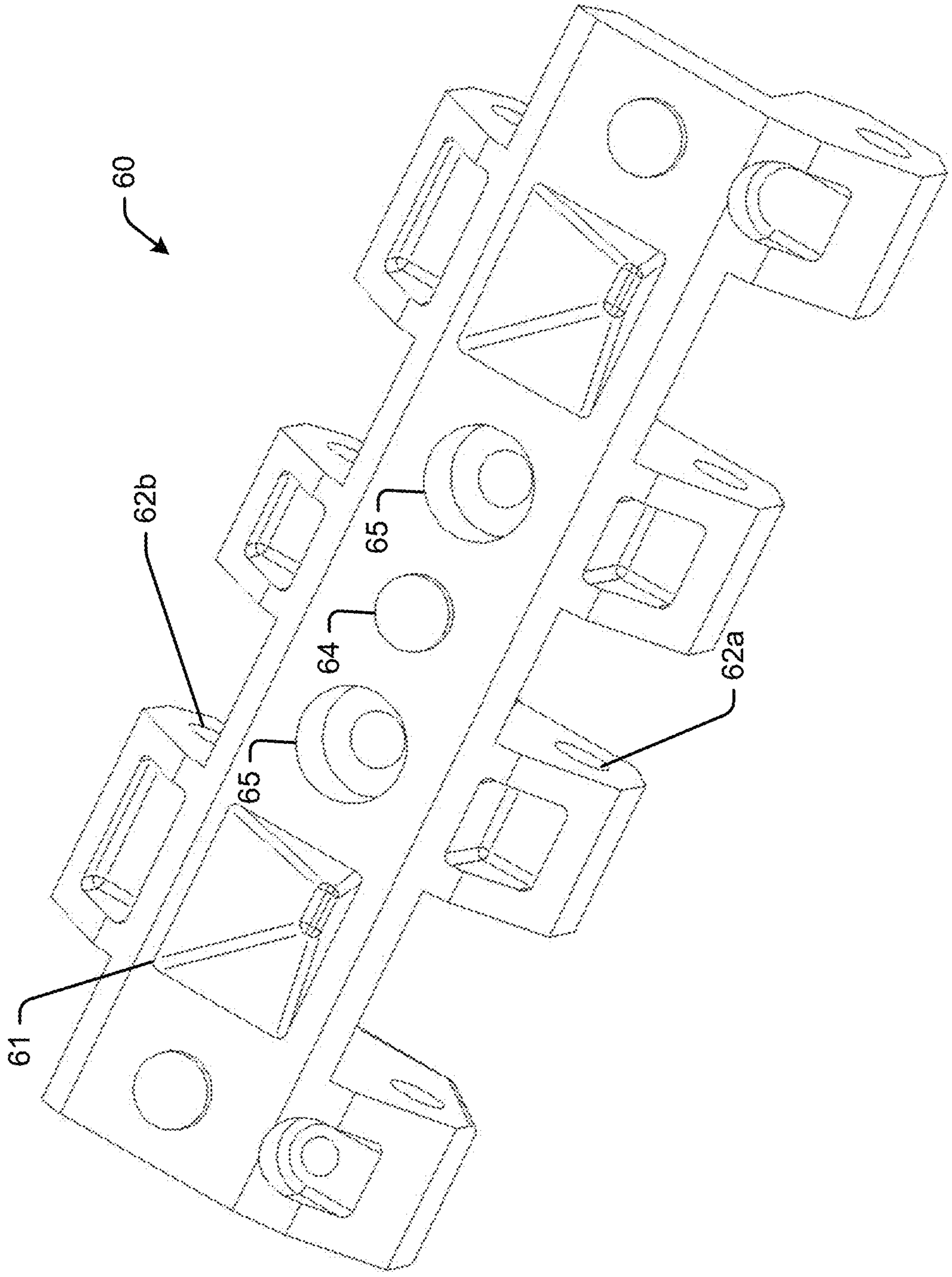
FIG. 15 is a bottom view of an example track member shown in FIG. 13.

FIG. 14 is a top view of an example track member 60 shown in FIG. 13. FIG. 15 is a bottom view of an example track member 60 shown in FIG. 13. The track systems 12 each include a plurality of these interlocking track members 60. In an example, the track members 60 are all identical injection molded components. In an example, the track member 60 is a thermoplastic elastomer. In an example, each track member 60 is approximately 4 inches in length and 1 inch in width, although other sizes may also be suitable and may vary depending at least in part on design considerations such as, but not limited to, the size track, the type terrain to be traversed, the size of the device 10 and/or wheelchair, among other factors.

Each track system 12 includes a plurality of individual track members 60 having protrusions or cleats 61. The track members 60 are linked to one another by individual rods as described above. For example, the track members 60 may be linked by individual rods provided through openings 62*a* in a first cleat and through openings 62*b* in the adjacent cleat. The linked track members 60 form a belt that spans between the drive cog 36 and the stabilizing (or front) cog 40.

In an example, at least some of the individual track members 60 may include mounting structures 63-64 through which traction devices (not shown) may be secured. For example, the individual track members 12 may be configured to accept hardened inserts (e.g., metal studs) for added traction in snow, and/or soft (e.g., rubber or soft plastic) inserts for added traction on hard surfaces. In the example shown, the track members 12 may include openings 63-64 so a ⅜ hex nut can accept a threaded insert in the middle of the track members 12, and the outside surface of the track member 12 can accept two #10 screws (e.g., through openings 65).

Figure 16:
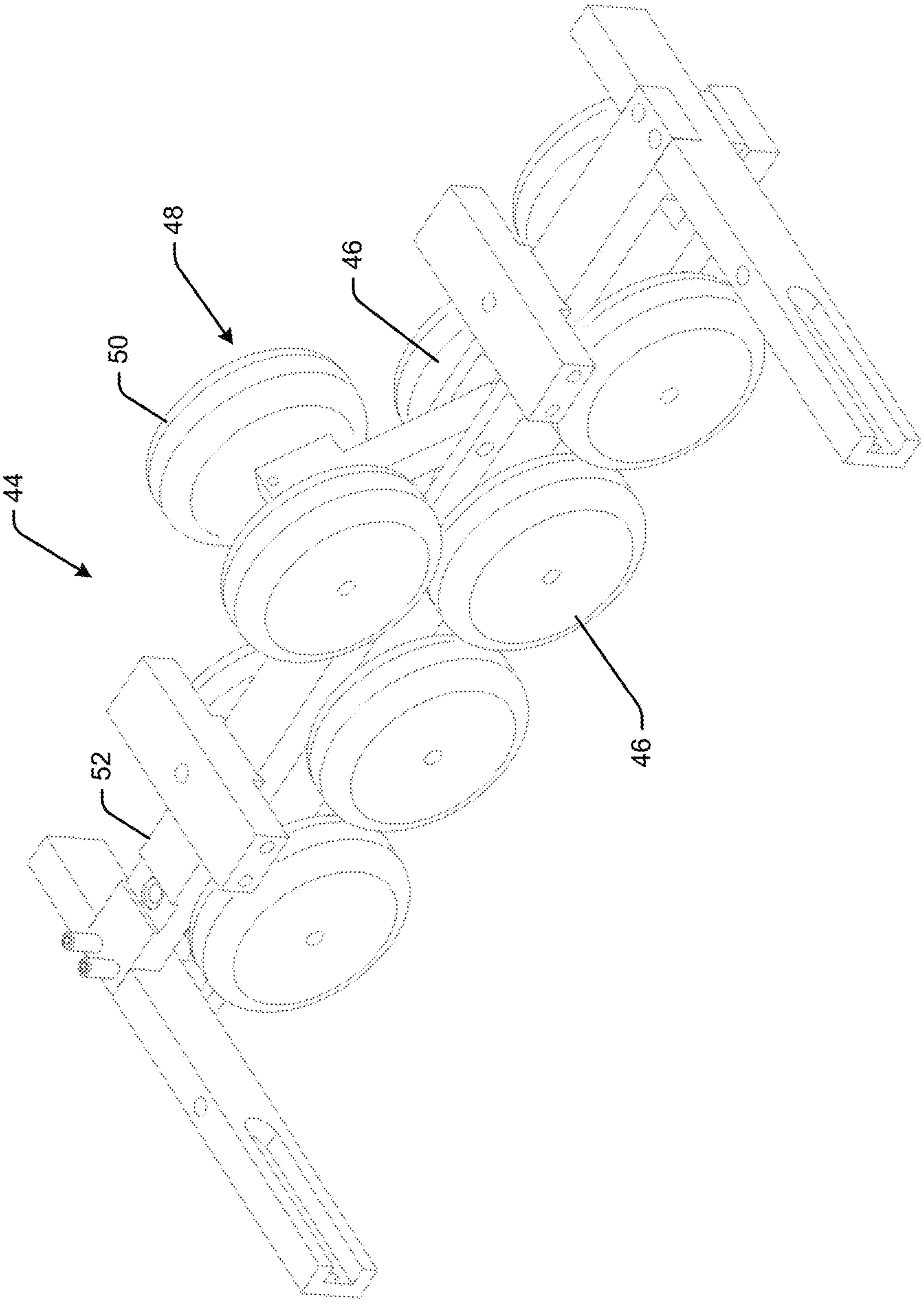
FIGS. 16 and 17 are perspective views of an example bogie suspension assembly of the example powered track attachment for a wheelchair.
Figure 17:
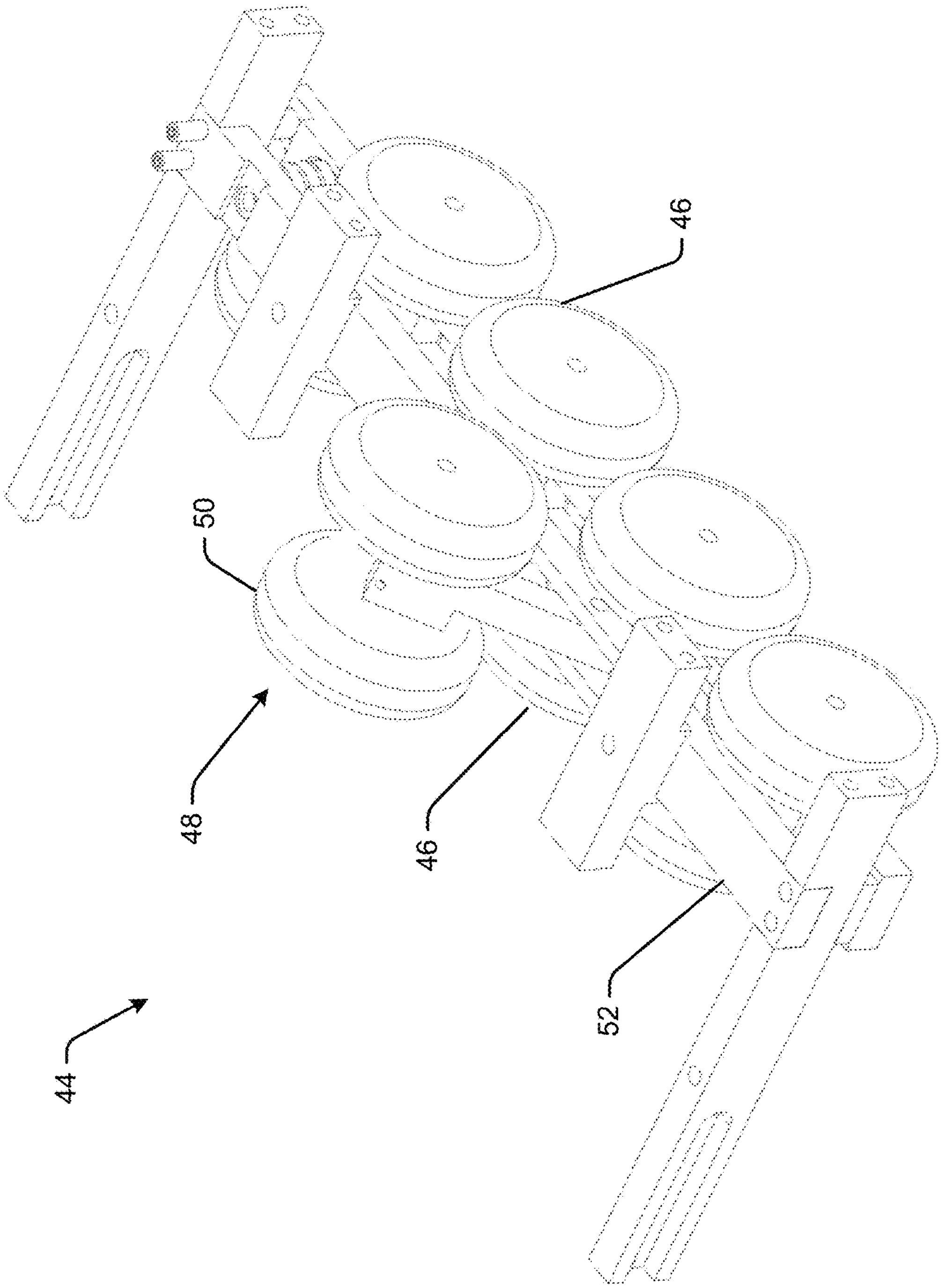
Figure 18:
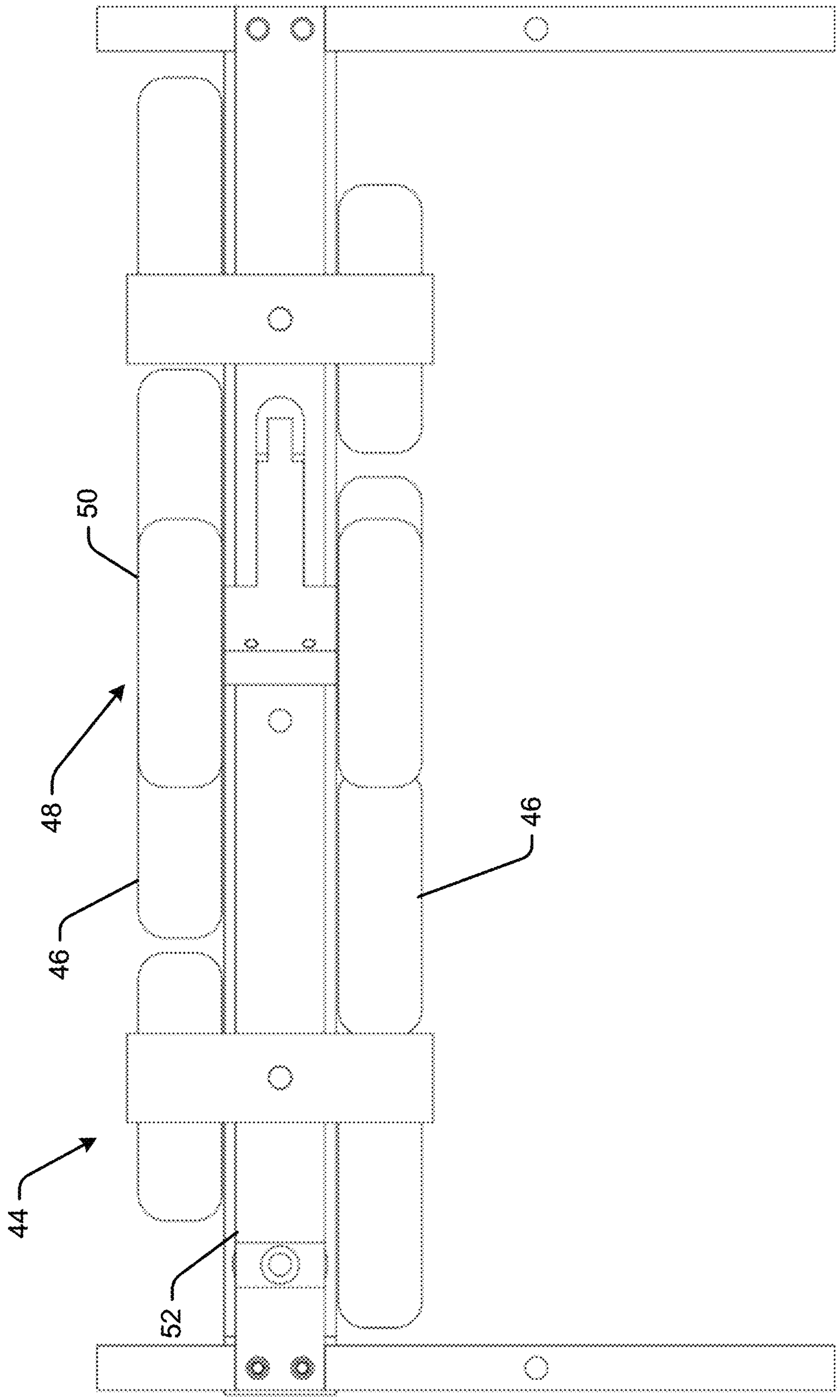
FIG. 18 is a top view of the example bogie suspension assembly shown in FIGS. 16 and 17.
Figure 19:
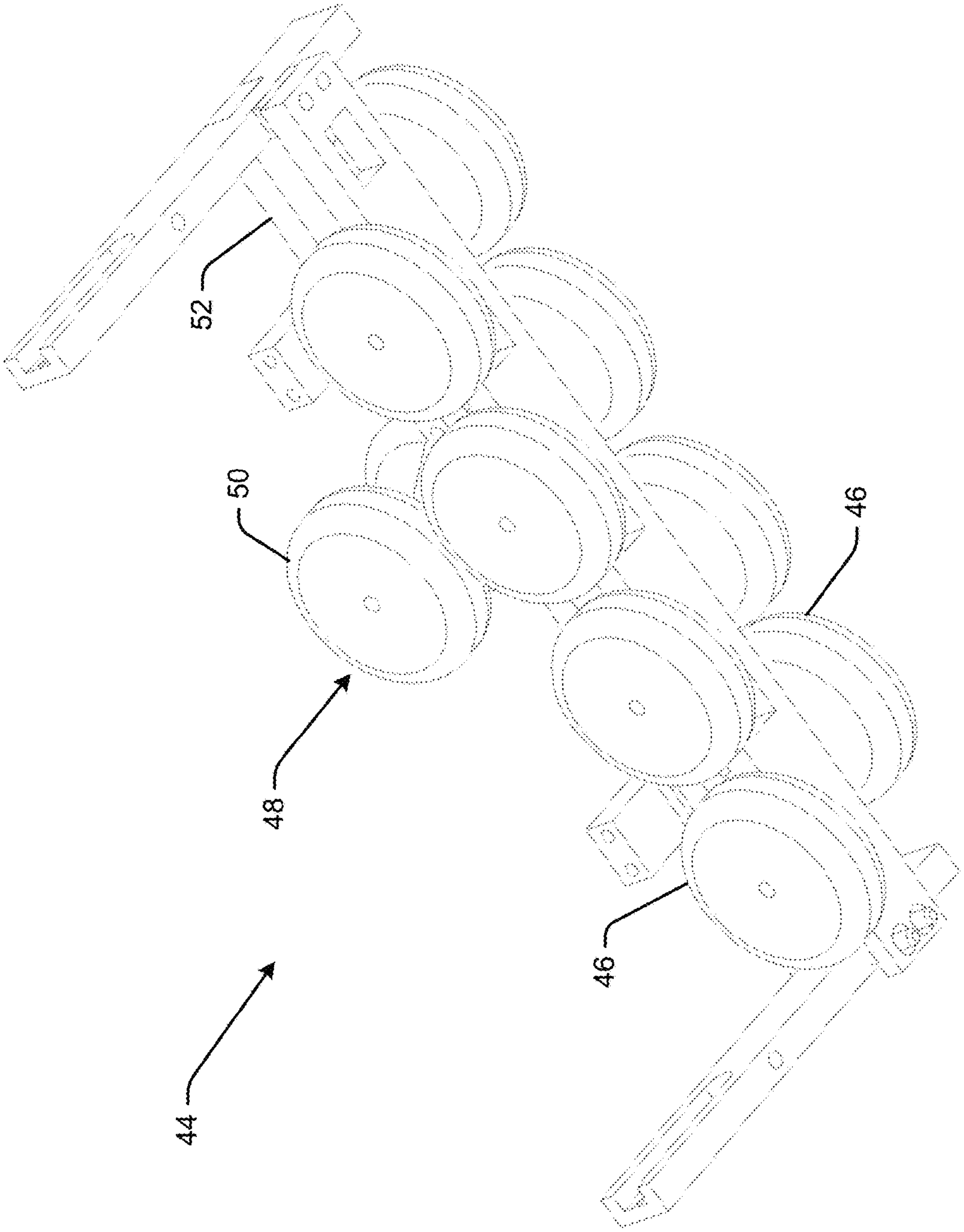
FIG. 19 is a bottom perspective view of the example bogie suspension assembly shown in FIGS. 16 and 17.
Figure 20:
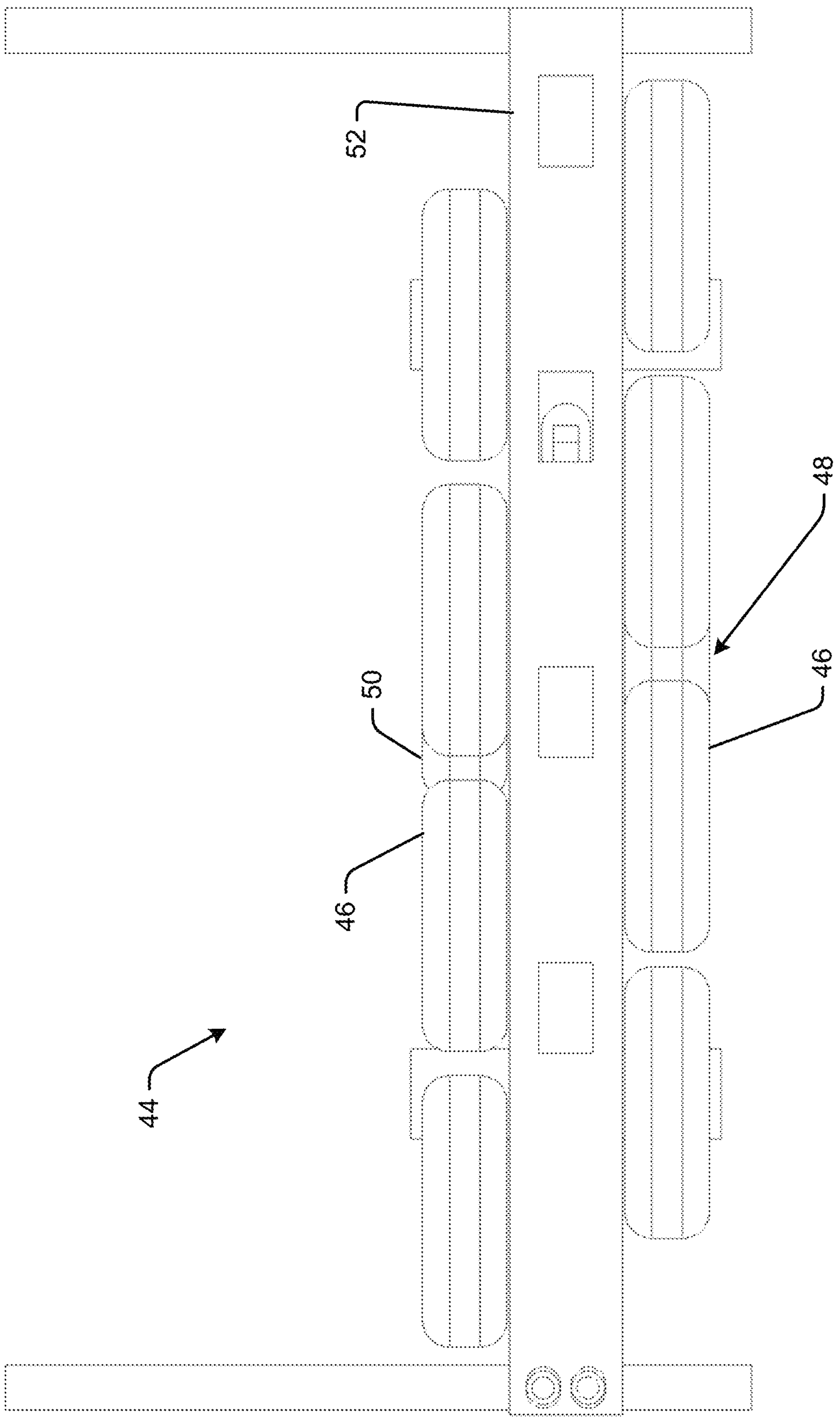
FIG. 20 is a bottom view of the example bogie suspension assembly corresponding to FIG. 19.

The belt formed by the individual track members 12 linked together winds around a path including the drive cog 36 and the stabilizing cog 40 and spanning the bogie wheels 46. In an example, the bogie wheel(s) 46 are provided as the bogie suspension system 44. FIGS. 16 and 17 are perspective views of an example bogie suspension assembly 44 of the example powered track attachment for a wheelchair. The bogie suspension assembly 44 provides bogie wheels 46, and serves as suspension support for the device 10. In an example, the bogie suspension assembly 44 is connected to the frame separately from the track systems 12, providing a smoother ride for the user. FIG. 18 is a top view of the example bogie suspension assembly 44 shown in FIGS. 16 and 17. FIG. 19 is a bottom perspective view of the example bogie suspension assembly shown in FIGS. 16 and 17. FIG. 20 is a bottom view of the example bogie suspension assembly corresponding to FIG. 19.

At least one bogie wheel 46 may be provided between the drive cog 36 and the stabilizing (or front) cog 40. The bogie wheels 46 are offset allowing for a greater distribution of weight by transferring the weight of the powered track attachment 10, the user, and the wheelchair, to a greater portion of the individual track members 60.

The bogie suspension system 44 may also include at least one spring-loaded tensioner 48. In an example, the spring-loaded tensioner 48 is located approximately midway along the length of the top portion of the belt formed by the track members 60. The spring-loaded tensioner 48 may press against the belt to remove slack in the track system and maintain the track system 12 in continuous tension during operation over a variety of different types of terrain.

FIGS. 21 and 22 show the example powered track attachments 10 for a wheelchair 1 in use on an illustrative sandy beach 2. The powered track attachment 10 may be operated to move the wheelchair 1 over various terrains 2 that the wheelchair 1 might not otherwise be able to traverse. The example sandy beach 2 is shown in these figures for purposes of illustration of various surfaces over which the powered track attachment 10 for a wheelchair 1 may be operated. However, the powered track attachment 10 may be operated in any of a variety of environments, including sand, dirt, gravel, grass, leaves, and other environments that may be difficult to traverse by the wheelchair 1 alone without risking the safety of the user.

It is noted that these environments are not intended to be limiting in any manner. The powered track attachments 10 for a wheelchair 1 may be utilized in any of a wide variety of different environments, as will be readily understood by those having ordinary skill in the art after becoming familiar with the teachings herein. The scope of the claims is not intended to be limited to the illustrative environments shown and described herein.

The examples shown and described are provided for purposes of illustration and are not intended to be limiting. Still other examples are also contemplated.

The invention claimed is:

1. A powered track attachment for a wheelchair, comprising:

a frame supporting an electric motor;

a wheel platform attached to the frame, the wheel platform supporting wheels on the wheelchair;

at least one track system;

a plurality of individual track members of the at least one track system, a majority of the plurality of individual track members having protrusions formed thereon, the plurality of individual track members linked together to form a continuous track;

at least one drive cog for the at least one track system, the at least one drive cog having a circumferential engagement pattern comprising a repeating H-shape, wherein the repeating H-Shape defines a plurality of depressions formed in both a top surface and side surfaces of the drive cog, the at least one track system comprising a plurality of individual track members each having at least two protrusions extending therefrom, the at least two protrusions configured to mate in a nesting engagement with the depressions in the top surface and the side surface of the at least one drive cog; and a stabilizing cog positioned at an opposite end of the continuous track from the drive cog, the stabilizing cog having a corresponding engagement pattern to maintain track stability and alignment during independent rotation of the track system;

wherein the at least one drive cog rotates under power of the electric motor to move the continuous track and move the wheelchair across terrain.

2. The powered track attachment of claim 1, each of the track members have two protrusions for selectively mating with the plurality of depressions formed in the drive cog.

3. The powered track attachment of claim 1, further comprising separate track systems, wherein each of the separate track systems has a drive cog, the drive cog of each of the separate track systems powered by separate motors to independently move the continuous track of each of the separate track systems relative to one another.

4. The powered track attachment of claim 1, further comprising a ramp to lower to the ground and provide a low entry angle for the wheelchair onto the wheel platform, wherein the ramp is raised after the wheelchair is on the wheel platform.

5. The powered track attachment of claim 1, wherein the wheel platform has a cradle formed therein to receive rear push wheels of the wheelchair.

6. The powered track attachment of claim 1, wherein the wheel platform has a cradle formed therein to receive front font-casters of the wheelchair, and an integrated t-slot extrusion with a capture mechanism to adjust to a width of the front casters of the wheelchair.

7. The powered track attachment of claim 1, further comprising a central coupler joining a first track system to a second track system, the central coupler adjustable to adjust a lateral distance of the wheel platform from the frame to accommodate a rear push wheel of the wheelchair.

8. The powered track attachment of claim 1, further comprising a drive motor configured as a hub motor and wherein an external profile of the drive cog is mated to the outside of the hub motor.

9. The powered track attachment of claim 1, wherein at least some of the plurality of individual track members are configured to accept hardened inserts for traction in snow, and soft inserts for traction on hard surfaces.

10. The powered track attachment of claim 1, further comprising a stabilizer cog on an opposite end of the continuous track from the at least one drive cog.

11. The powered track attachment of claim 10, further comprising at least one bogie wheel provided in the continuous track between the at least one drive cog and the stabilizing cog.

12. The powered track attachment of claim 11, further comprising a bogie suspension system having the at least one bogie wheel, the bogie suspension system mounting the at least one bogie wheel on a separate structure from the frame to provide shock cushioning for the wheelchair and user.

13. The powered track attachment of claim 12, further comprising a plurality of bogie wheels on the bogie suspension system, the plurality of bogie wheels offset from one another for weight distribution by transferring weight of the powered track attachment, the user, and the wheelchair to individual sections of the track members forming the continuous track.

14. The powered track attachment of claim 12, further comprising a spring-loaded tensioner on the bogie suspension system to maintain the track system in continuous tension.

15. The powered track attachment of claim 4, further comprising a bungee with an adjustable length hook attached to the ramp for the user to lower and raise the ramp and to secure the ramp in a raised position.

16. The powered track attachment of claim 6, wherein the capture mechanism includes a rope cinch lock securing a front caster axle to a front caster cradle.

17. A powered track attachment for a wheelchair, comprising:

a first wheel platform and a second wheel platform both supporting the wheelchair;

a first track system connected to a second track system, the first and second track systems supporting the first and second wheel platforms;

a plurality of individual track members in each of the first and second track systems, at least some of the plurality of individual track members having protrusions formed thereon, the plurality of individual track members linked together forming a continuous track for each of the first and second track systems; and a first drive cog for the first track system and a second drive cog for the second track system, the first and second drive cogs having a circumferential engagement pattern comprising a repeating H-shape, wherein the repeating H-shape defines a plurality of depressions formed in both a top surface and side surfaces of the drive cog, the first and second track systems each comprising a plurality of individual track members each having at least two protrusions extending therefrom, the at least two protrusions configured to mate in a nesting engagement with the depressions in the top and side surfaces of the drive cog; and a first stabilizer cog on an opposite end of the continuous track of the first track system from the first drive cog, and a second stabilizer cog on an opposite end of the continuous track of the second track system from the second drive cog, the first and second stabilizer cogs each having a corresponding engagement pattern to maintain track stability and alignment during independent rotation of the first and second track systems, the first drive cog powered independently of the second drive cog to independently move the continuous track of the first track system and the continuous track of the second track system and thereby move the wheelchair across varying terrain.

18. The powered track attachment of claim 17, further comprising a first bogie suspension system for the first track system, and a second bogie suspension system for the second track system, the first and second bogie suspension systems each having a plurality of bogie wheels and at least one tensioner.

19. The powered track attachment of claim 17, wherein the first wheel platform and the second wheel platform each have a forward portion or separate cradle formed therein to receive front casters of the wheelchair, wherein each cradle includes an integrated t-slot extrusion capture mechanism that operates to adjust to a width of the front casters of the wheelchair to help retain a solid hold on the wheelchair when mounted to the powered track attachment, and wherein a capture system includes a rope cinch lock securing a front caster axle to the cradle.

20. The powered track attachment of claim 18, wherein the first and second bogie suspension systems are mounted on a separate structure from the first and second track systems to provide shock cushioning for the wheelchair and user.

* * * * *